(12) United States Patent
Hasegawa et al.

(10) Patent No.: US 9,326,197 B2
(45) Date of Patent: Apr. 26, 2016

(54) BASE STATION

(71) Applicant: FUJITSU LIMITED, Kawasaki-shi, Kanagawa (JP)

(72) Inventors: Noboru Hasegawa, Oota (JP); Takeshi Kunugi, Yokohama (JP); Yuki Shinada, Warabi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/681,508

(22) Filed: Apr. 8, 2015

(65) Prior Publication Data
US 2015/0334608 A1 Nov. 19, 2015

(30) Foreign Application Priority Data
May 13, 2014 (JP) .................. 2014-099956

(51) Int. Cl.
H04W 36/00 (2009.01)
H04W 48/20 (2009.01)
H04W 52/02 (2009.01)
H04W 88/08 (2009.01)

(52) U.S. Cl.
CPC .......... *H04W 36/0061* (2013.01); *H04W 48/20* (2013.01); *H04W 52/0206* (2013.01); *H04W 88/08* (2013.01)

(58) Field of Classification Search
CPC ................. H04W 36/0016; H04W 36/0061; H04W 36/08; H04W 36/14; H04W 48/20; H04W 52/02; H04W 52/0206; H04W 60/00; H04W 88/08

USPC .......... 455/13.4, 418–420, 435.1–452.2, 574; 370/331
See application file for complete search history.

(56) References Cited

U.S. PATENT DOCUMENTS

| | | | | |
|---|---|---|---|---|
| 6,487,605 | B1 * | 11/2002 | Leung | H04W 8/12 370/331 |
| 8,340,703 | B2 * | 12/2012 | Laroia | H04B 7/2678 455/502 |
| 2007/0058588 | A1 * | 3/2007 | Fashandi | H04W 36/0055 370/331 |

FOREIGN PATENT DOCUMENTS

| | | |
|---|---|---|
| JP | 2009-510835 | 3/2009 |
| JP | 2012-039295 | 2/2012 |
| JP | 2012-054767 | 3/2012 |
| JP | 2013-131969 | 7/2013 |
| WO | 2007035447 | 3/2007 |

\* cited by examiner

*Primary Examiner* — Michael Mapa
(74) *Attorney, Agent, or Firm* — Fujitsu Patent Center

(57) ABSTRACT

A base station includes a receiving unit, a determining unit, a control unit, and a transmitting unit. The receiving unit receives a connection request signal when the base station is in a power-saving state. The determining unit, when the receiving unit receives the connection request signal, determines whether a priority of the base station is higher than a priority of a different base station that belongs to a same group as the base station. The control unit, when the determining unit determines that the priority of the base station is higher than the priority of the different base station, causes the base station to return from the power-saving state to a normal state. The transmitting unit wirelessly transmits a notification signal after the base station is returned to the normal state by the control unit.

6 Claims, 21 Drawing Sheets

BASE STATION

CROSS-REFERENCE TO RELATED APPLICATION

This application is based upon and claims the benefit of priority of the prior Japanese Patent Application No. 2014-099956, filed on May 13, 2014, the entire contents of which are incorporated herein by reference.

FIELD

The embodiments discussed herein are related to a base station.

BACKGROUND

In a wireless communication network, a base station continuously transmits a notification signal by a downlink channel in order to determine whether a mobile station is located in an area formed by the base station. The mobile station monitors the notification signal transmitted by the base station, and moves from one base station to another (handover), transmits an uplink signal, or receives a call (paging) signal. The base station transmits the notification signal at any time of day and night, so that a downlink signal, such as the notification signal, is transmitted even in a place, such as a midnight business district or a less-populated area, where the number of persons who use mobile stations, such as mobile phones, is small, for example.

Patent Document 1: Japanese Laid-open Patent Publication No. 2012-39295
Patent Document 2: Japanese Laid-open Patent Publication No. 2013-131969
Patent Document 3: Japanese Laid-open Patent Publication No. 2012-54767
Patent Document 4: Japanese National Publication of International Patent Application No. 2009-510835

The base station continues to transmit the notification signal regardless of whether a mobile station that may perform communication is located in the area formed by the base station; therefore, unnecessary power consumption due to the transmission increases and the power may be wasted. In other words, a ratio of the amount of actually-provided services to the power usage is low, and the power is inefficiently used in the base station. However, if the base station suspends the transmission of the notification signal, mobile stations are unable to receive the notification signal; therefore, when a user of a mobile station enters the above described area, the user is unable to receive a desired service. Further, if the base station weakens the transmission power in order to reduce the power consumption, an area where services are available is reduced.

SUMMARY

According to an aspect of the embodiments, a base station includes: a receiving unit that receives a connection request signal when the base station is in a power-saving state; a determining unit that, when the receiving unit receives the connection request signal, determines whether a priority of the base station is higher than a priority of a different base station that belongs to a same group as the base station; a control unit that, when the determining unit determines that the priority of the base station is higher than the priority of the different base station, causes the base station to return from the power-saving state to a normal state; and a transmitting unit that wirelessly transmits a notification signal after the base station is returned to the normal state by the control unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The base station disclosed in the present application is not limited to the embodiments below.

Figure 1:
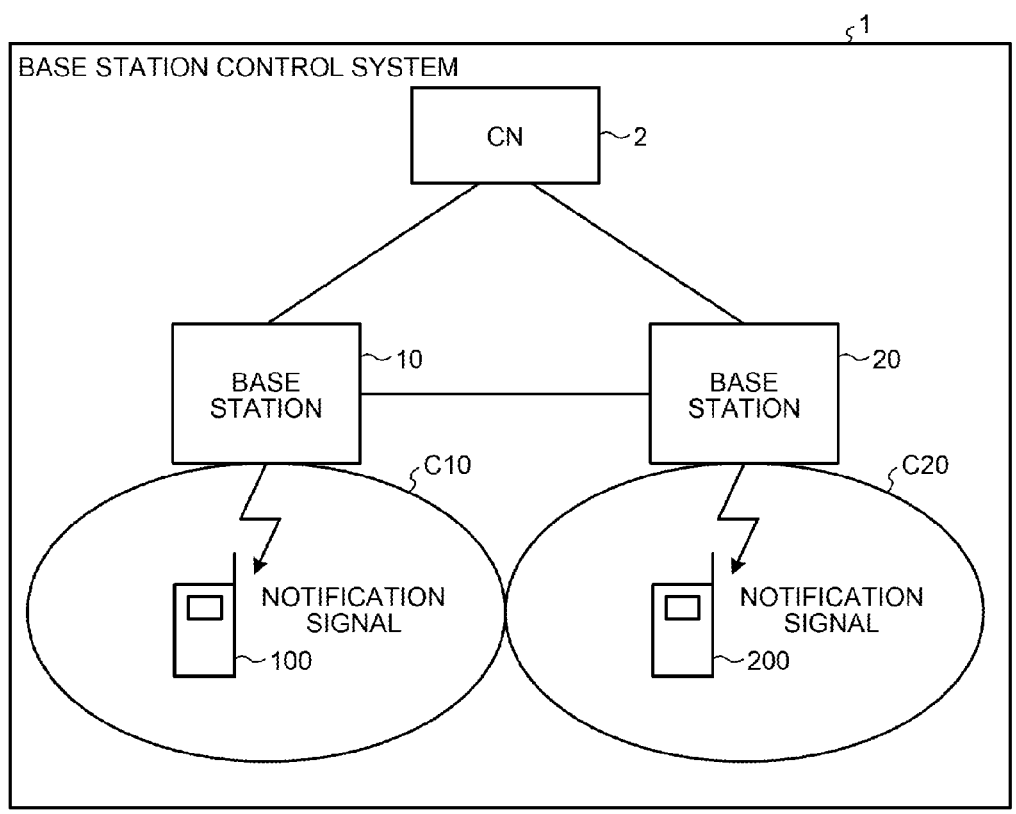
FIG. 1 is a diagram illustrating an overall configuration of a base station control system according to an embodiment.

FIG. 1 is a diagram illustrating an overall configuration of a base station control system 1 according to an embodiment. As illustrated in FIG. 1, the base station control system 1 includes a plurality of base stations 10 and 20. Each of the base stations 10 and 20 is connected to a higher-level core network (CN) 2 by wire. The CN 2 controls transmission of various wired signals transmitted and received between the CN 2 and each of the base stations 10 and 20 and between the base station 10 and the base station 20. The base stations 10 and 20 form cells C10 and C20, respectively, each of which serves as a communication area where various wireless signals can be transmitted and received to and from mobile stations. A mobile station 100 is located in the cell C10 and receives a notification signal from the base station 10, and a mobile station 200 is located in the cell C20 and receives a notification signal from the base station 20.

The base station 10 suppresses transmission of a downlink signal (for example, the notification signal) by causing a transmission apparatus to turn off a power supply or enter a sleep state, thereby saving power. For example, the base station 10 monitors a pilot signal from the mobile station 100, and when the mobile station 100 transmits a pilot signal with activation of a power supply or with operation of transmitting communication in order to communicate with the base station 10, the base station 10 causes the transmission apparatus to turn on the power supply or enter a normal state from the sleep state, and starts to transmit a notification signal by being triggered by reception of the pilot signal. Therefore, the base station 10 need not continuously transmit the notification signal. Consequently, unnecessary power consumption due to the transmission of the notification signal is suppressed. As a result, a waste of power is prevented.

Figure 2:
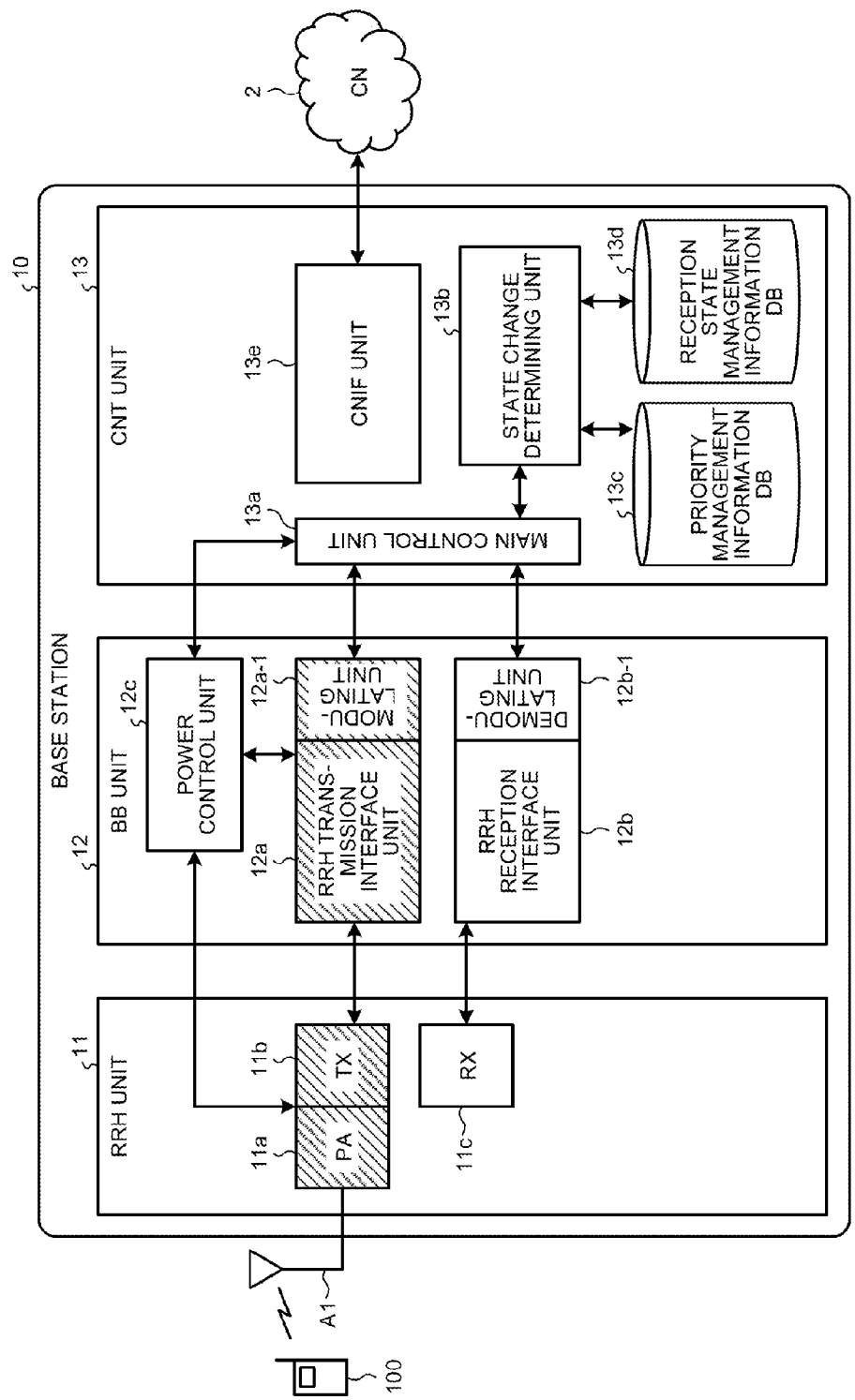
FIG. 2 is a diagram illustrating a functional configuration of a base station according to the embodiment.

FIG. 2 is a diagram illustrating a functional configuration of the base station 10 according to the embodiment. As illustrated in FIG. 2, the base station 10 includes a remote radio head (RRH) unit 11, a base band (BB) unit 12, and a control (CNT) unit 13. All of the components are connected to one another so as to be able to input and output signals and data unidirectionally or bidirectionally. The RRH unit 11 transmits and receives various wireless signals to and from the mobile station 100, for example. The BB unit 12 modulates or demodulates wireless signals. The CNT unit 13 performs call control, protocol control, or the like for communication with the CN 2, and functions as an Internet protocol (IP) interface between the base station 10 and the CN 2.

In FIG. 2, blocks with hatching are parts that turn off the power supplies or enter the sleep states when the base station 10 is in a power-saving state.

The RRH unit 11 includes a power amplifier (PA) 11a that is an amplifying device, a transmitter (TX) 11b that is a transmitting device, and a receiver (RX) 11c that is a receiving device. The RRH unit 11 need not necessarily be incorporated in the base station 10, and may be installed as a separate device outside the base station 10.

The BB unit 12 includes an RRH transmission interface unit 12a, an RRH reception interface unit 12b, and a power control unit 12c. The RRH transmission interface unit 12a includes a modulating unit 12a-1 that modulates a signal transmitted to the mobile station 100, and performs data communication with the TX 11b. The RRH reception interface unit 12b includes a demodulating unit 12b-1 that demodulates a signal received from the mobile station 100, and performs data communication with the RX 11c. The power control unit 12c controls electric power supplied to each of the units included in the base station 10.

The CNT unit 13 includes a main control unit 13a, a state change determining unit 13b, a priority management information database (DB) 13c, a reception state management information DB 13d, and a core network interface (CNIF) unit 13e. The main control unit 13a performs call control, resource management, protocol control, device monitoring control, or the like. The state change determining unit 13b determines whether to cause the base station 10 to enter the power-saving state or to return from the power-saving state. The priority management information DB 13c stores therein information indicating priority for cancelling the power-saving state of a neighboring base station belonging to a predetermined group. The reception state management information DB 13d stores therein reception qualities (for example, channel quality indicator (CQI) values) of the base station 10 and the neighboring base station for each mobile station. The CNIF unit 13e manages IP layers of wired signals transmitted and received to and from the other base station 20 and an IP network, such as the CN 2.

Figure 3:
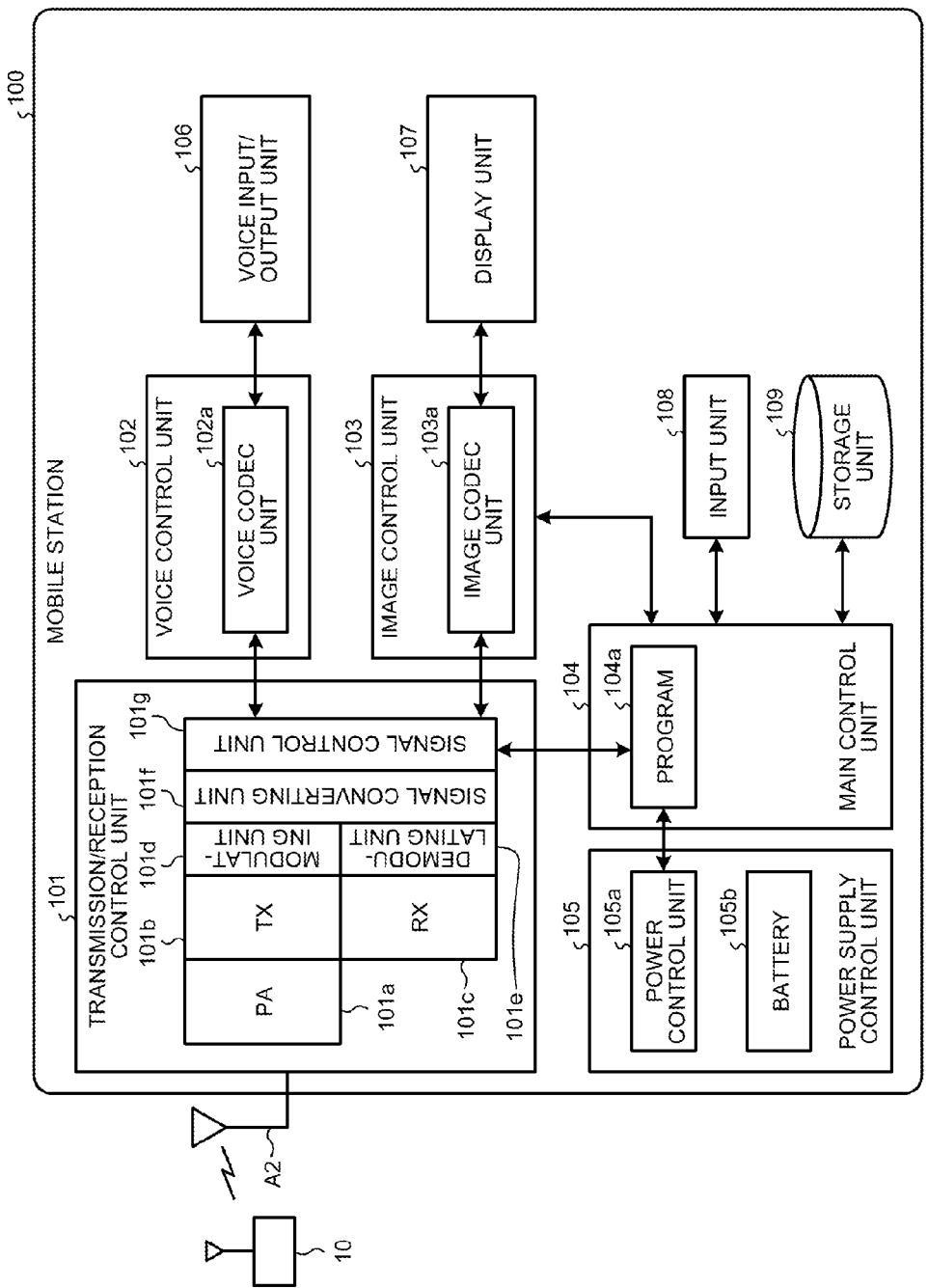
FIG. 3 is a diagram illustrating a functional configuration of a mobile station according to the embodiment.

FIG. 3 is a diagram illustrating a functional configuration of the mobile station 100 according to the embodiment. As illustrated in FIG. 3, the mobile station 100 includes a transmission/reception control unit 101, a voice control unit 102, an image control unit 103, a main control unit 104, a power supply control unit 105, a voice input/output unit 106, a display unit 107, an input unit 108, and a storage unit 109. All of the components are connected to one another so as to be able to input and output signals and data unidirectionally or bidirectionally.

The transmission/reception control unit 101 includes a power amplifier (PA) 101a that is an amplifying device, a transmitter (TX) 101b that is a transmitting device, and a receiver (RX) 101c that is a receiving device. The transmission/reception control unit 101 further includes a modulating unit 101d that modulates a signal transmitted to the mobile station 100, a demodulating unit 101e that demodulates a signal received from the mobile station 100, and a signal converting unit 101f that converts transmission and reception signals. The transmission/reception control unit 101 further includes a signal control unit 101g that performs call control, resource management, protocol control, device monitoring control, or the like.

The voice control unit 102 includes a voice codec unit 102a and converts user data of the transmission/reception control unit 101 and an input/output signal of the voice input/output unit 106 to each other. Similarly, the image control unit 103 includes an image codec unit 103a and converts user data of the transmission/reception control unit 101 and an input/output signal of the display unit 107 to each other. The main control unit 104 executes a program 104a, such as an operating system (OS) or an application program, to implement various functions via a user interface. The power supply control unit 105 supplies, by a power control unit 105a, electric power charged in a battery 105b to each of the devices of the mobile station 100. The voice input/output unit 106 inputs and outputs a voice signal from and to the voice control unit 102. The display unit 107 inputs and outputs an image signal from and to the image control unit 103. The input unit 108 inputs characters, numbers, symbols, and the like in accordance with user operation. The storage unit 109 stores therein the program 104a to be executed by the main control unit 104.

Figure 4:
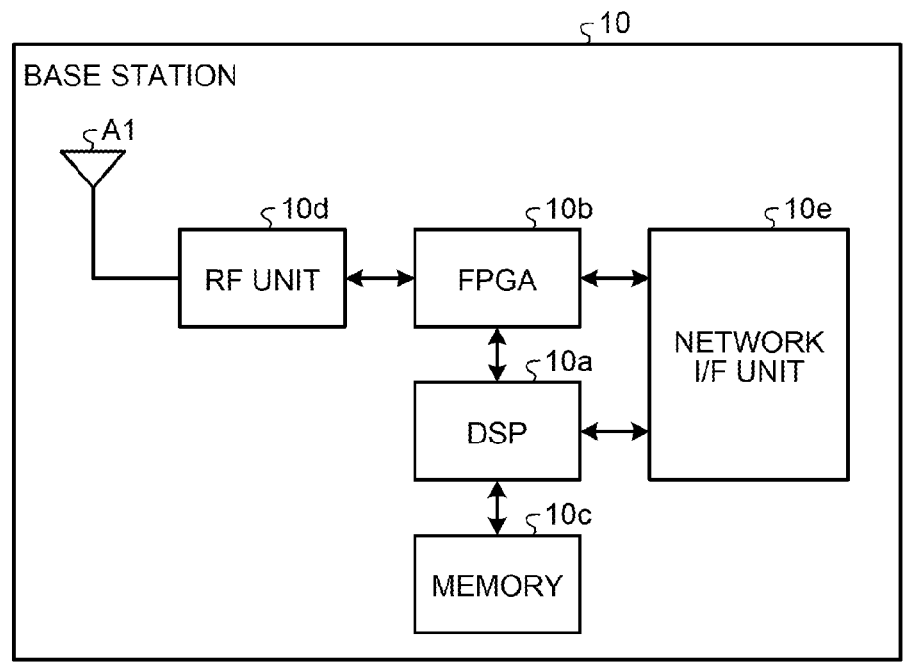
FIG. 4 is a diagram illustrating a hardware configuration of the base station according to the embodiment.

Next, a hardware configuration will be described. FIG. 4 is a diagram illustrating a hardware configuration of the base station 10 according to the embodiment. As illustrated in FIG. 4, the base station 10 includes, as hardware components, a digital signal processor (DSP) 10a, a field programmable gate array (FPGA) 10b, a memory 10c, a radio frequency (RF) unit 10d, and a network interface (I/F) unit 10e. The DSP 10a and the FPGA 10b are connected to each other so as to be able to input and output various signals and data via the network I/F unit 10e, such as a switch. The RF unit 10d includes an antenna A1. The memory 10c is configured by a random access memory (RAM), such as a synchronous dynamic random access memory (SDRM), by a read only memory (ROM), or by a flash memory, for example.

Regarding a correspondence relationship between the functional configuration and the hardware configuration of the base station 10, the RRH unit 11 is implemented by the RF unit 10d. The BB unit 12 is implemented by an integrated circuit, such as the DSP 10a or the FPGA 10b. In the CNT unit 13, the main control unit 13a and the state change determining unit 13b are implemented by an integrated circuit, such as the DSP 10a or the FPGA 10b. The priority management information DB 13c and the reception state management information DB 13d are implemented by the memory 10c. The CNIF unit 13e is implemented by the network I/F unit 10e.

Figure 5:
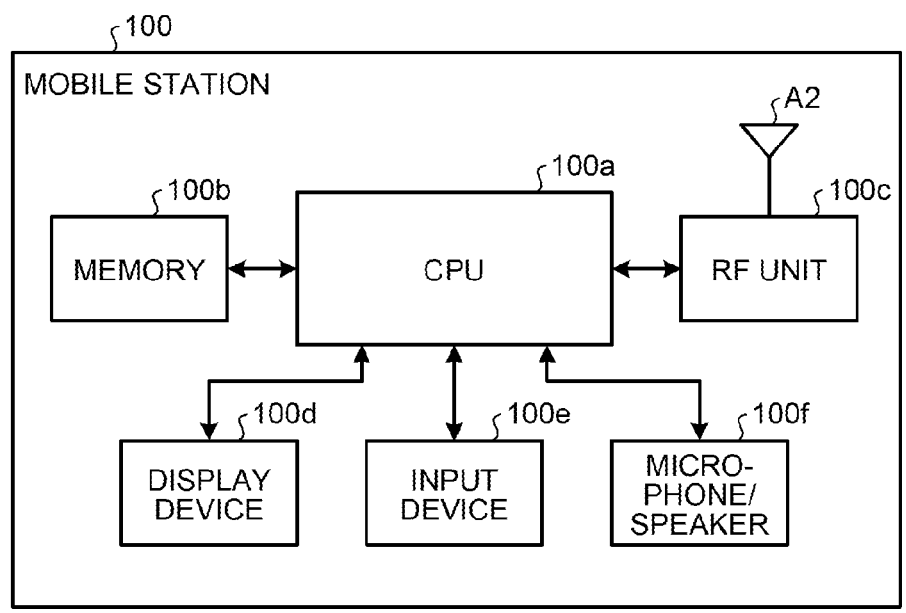
FIG. 5 is a diagram illustrating a hardware configuration of the mobile station according to the embodiment.

Further, the mobile station 100 as described above is implemented by a mobile phone, for example. FIG. 5 is a diagram illustrating a hardware configuration of the mobile station 100 according to the embodiment. As illustrated in FIG. 5, the mobile station 100 includes, as hardware components, a central processing unit (CPU) 100a, a memory 100b, an RF unit 100c including an antenna A2, a display device 100d, an input device 100e, and a microphone/speaker 100f. The memory 100b is configured by a RAM, such as an SDRM, by a ROM, or by a flash memory, for example.

Regarding a correspondence relationship between the functional configuration and the hardware configuration of the mobile station 100, the transmission/reception control unit 101 is implemented by the RF unit 10d. The voice control unit 102, the image control unit 103, the main control unit 104, and the power supply control unit 105 are implemented by an integrated circuit, such as the CPU 100a. The voice input/output unit 106 is implemented by the microphone/speaker 100f. The display unit 107 is implemented by the display device 100d, such as a liquid crystal display (LCD). The input unit 108 is implemented by the input device 100e, such as a touch panel or a button. The storage unit 109 is implemented by the memory 100b.

While the configuration of the base station 10 is described above in a representative manner, the configuration of the other base station 20 is the same as the configuration of the base station 10. Therefore, the same components are denoted by reference symbols with the same ends, and illustration and detailed explanation thereof will be omitted. The same applies to the mobile stations, that is, while the configuration of the mobile station 100 is described above in a representative manner, the configuration of the other mobile station 200 is the same as the configuration of the mobile station 100. Therefore, the same components are denoted by reference symbols with the same ends, and illustration and detailed explanation thereof will be omitted.

Next, operation will be described.

Figure 6:
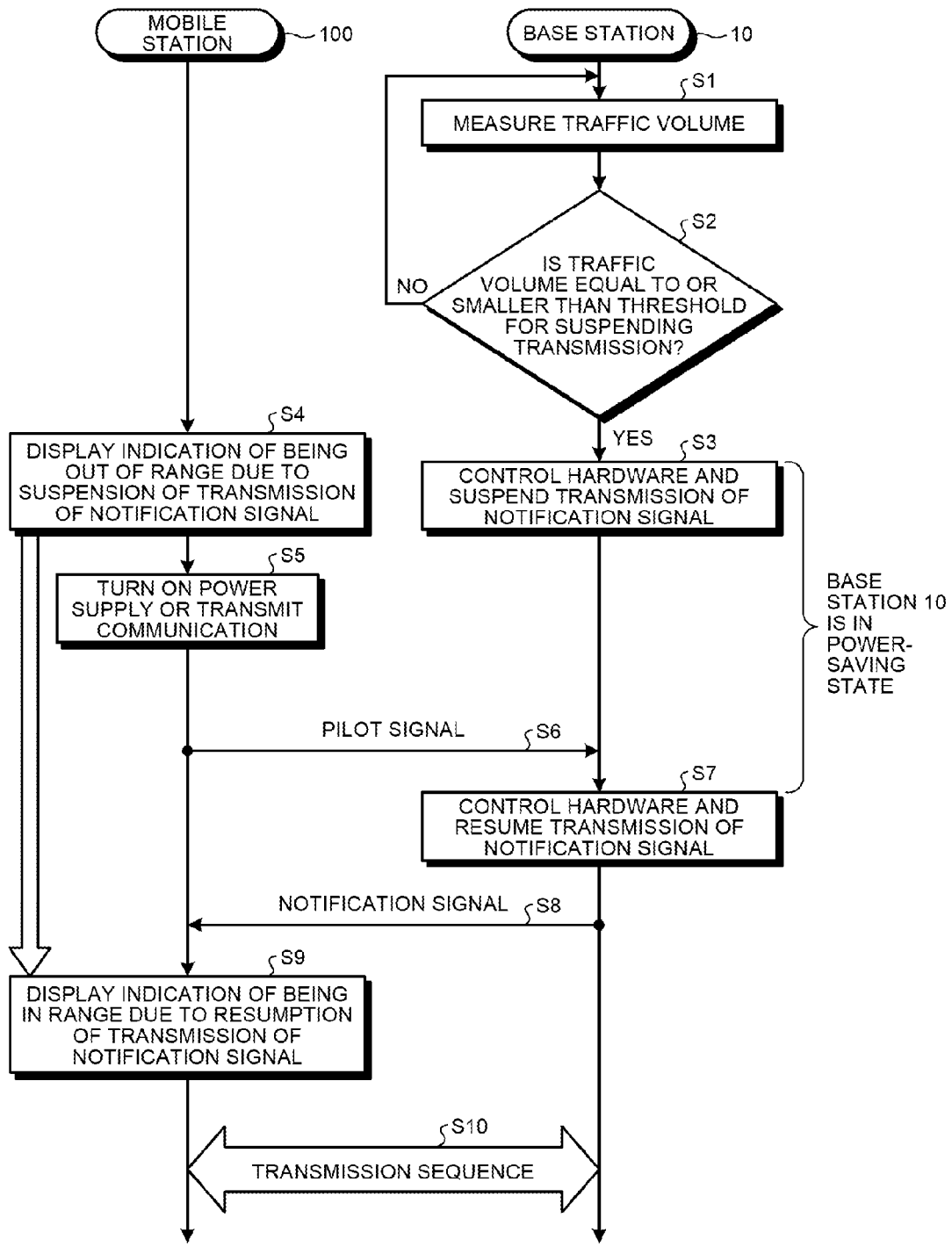
FIG. 6 is a flowchart for explaining operation of the base station control system according to the embodiment.

FIG. 6 is a flowchart for explaining operation of the base station control system 1 according to the embodiment. At Step S1, the state change determining unit 13b of the base station 10 measures a traffic volume of the base station 10. At Step S2, the state change determining unit 13b determines whether a result of the measurement is equal to or smaller than a threshold for suspending transmission of a notification signal.

As a result of the determination, if a measurement value of the traffic volume is not equal to or smaller than the threshold (NO at Step S2), the base station 10 continues the process at Step S1. If the measurement value is equal to or smaller than the threshold (YES at Step S2), the base station 10 enters the power-saving state. Specifically, if the measurement value of the traffic volume≤the threshold, the power control unit 12c of the base station 10 causes predetermined hardware (for example, the PA 11a, the TX 11b, the RRH transmission interface unit 12a, and the modulating unit 12a-1) to turn off the power supply or to enter the sleep state, and suspends transmission of the notification signal (Step S3). The traffic volume is, for example, the amount of data actually transmitted and received between the base station 10 and the mobile station 100; however, it is not limited thereto. The traffic volume may be the number of mobile stations located in the cell C10 of the base station 10.

At Step S3, the base station 10 reduces power consumption by stopping devices of a wireless transmitting system. Specifically, even in the power-saving state, devices of a wireless receiving system (for example, the RX 11c, the RRH reception interface unit 12b, and the demodulating unit 12b-1) of the base station 10 and the CNT unit 13 such as the main control unit 13a can operate normally. Therefore, the base station 10 can normally perform a process of receiving a pilot signal from a mobile station or a process of receiving communication from the CN 2 to a mobile station while suppressing power consumption due to the transmission of the notification signal.

Figure 7:
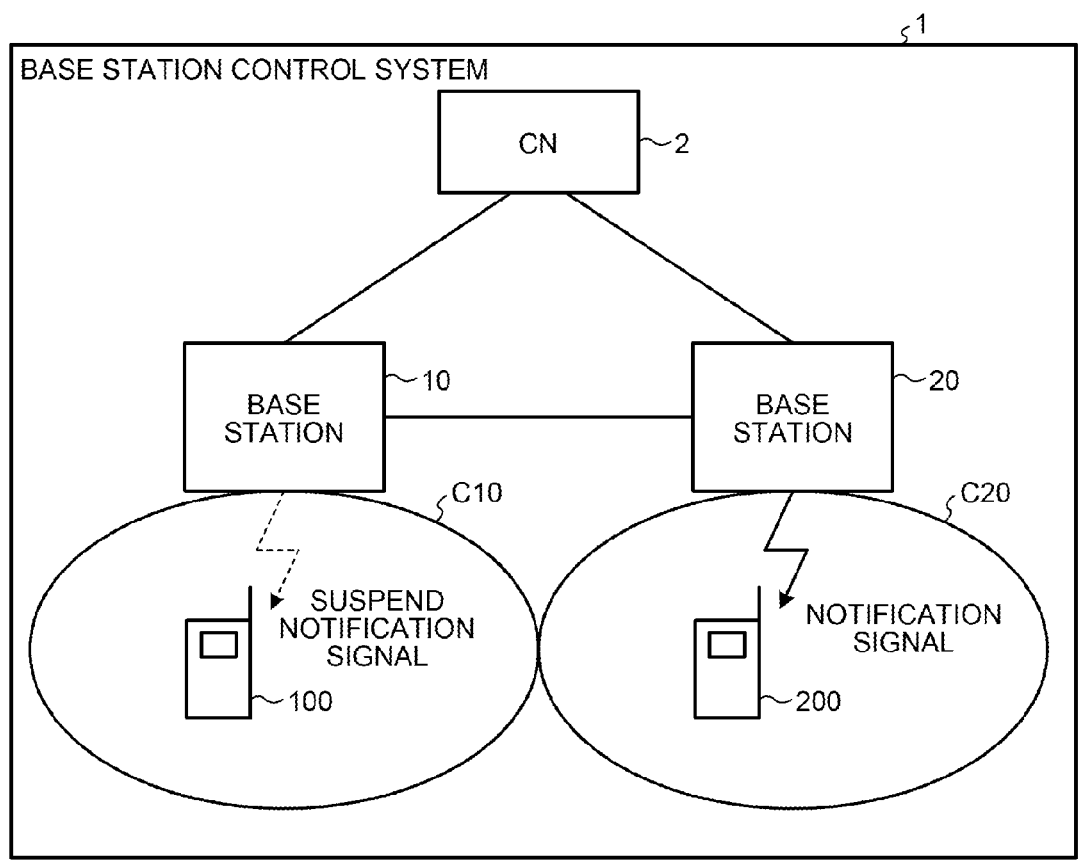
FIG. 7 is a diagram illustrating an overall configuration of the base station control system after the base station has entered a power-saving state in the embodiment.

FIG. 7 is a diagram illustrating an overall configuration of the base station control system 1 after the base station 10 has entered the power-saving state in the embodiment. As illustrated in FIG. 7, among the base stations 10 and 20 of the base station control system 1, the base station 10 has entered the power-saving state at Step S3 as described above. Therefore, the base station 10 does not transmit a notification signal while the base station 20 transmits a notification signal. The mobile station 100 is located in the cell C10 formed by the base station 10, but does not receive the notification signal from the base station 10, and therefore displays indication of being out of range (Step S4 in FIG. 6).

Figure 8:
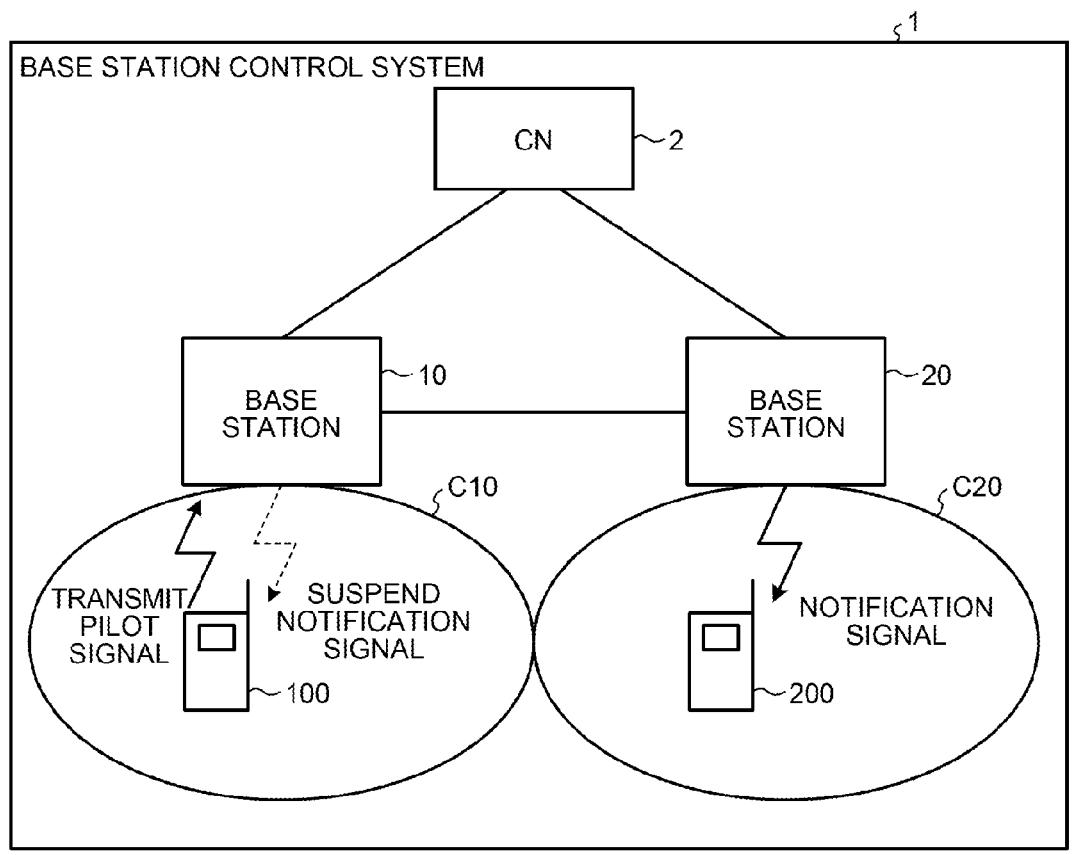
FIG. 8 is a diagram illustrating an overall configuration of the base station control system when the mobile station transmits a pilot signal in the embodiment.

Thereafter, if the mobile station 100 performs operation of turning on the power supply or operation of transmitting communication in the cell C10 (Step S5 in FIG. 6), the mobile station 100 transmits a pilot signal to the base station 10 in order to start communication with the base station 10 (Step S6). FIG. 8 is a diagram illustrating an overall configuration of the base station control system 1 when the mobile station 100 transmits the pilot signal in the embodiment. As illustrated in FIG. 8, the pilot signal transmitted from the mobile station 100 to the base station 10 serves as a trigger for the mobile station 100 to start communication with the base station 10.

The power control unit 12c of the base station 10, upon detecting reception of the pilot signal transmitted at Step S6 as described above, causes predetermined hardware (for example, the PA 11a, the TX 11b, the RRH transmission interface unit 12a, and the modulating unit 12a-1) to turn on the power supply, and resumes transmission of the notification signal (Step S7). At Step S8, the TX 11b of the base station 10 transmits the notification signal to the mobile station 100. The mobile station 100 is located in the cell C10 formed by the base station 10, and receives the notification signal from the base station 10, and therefore displays indication of being in range (Step S9). Consequently, the mobile station 100 can execute a transmission sequence with the base station 10 (Step S10).

Figure 9:
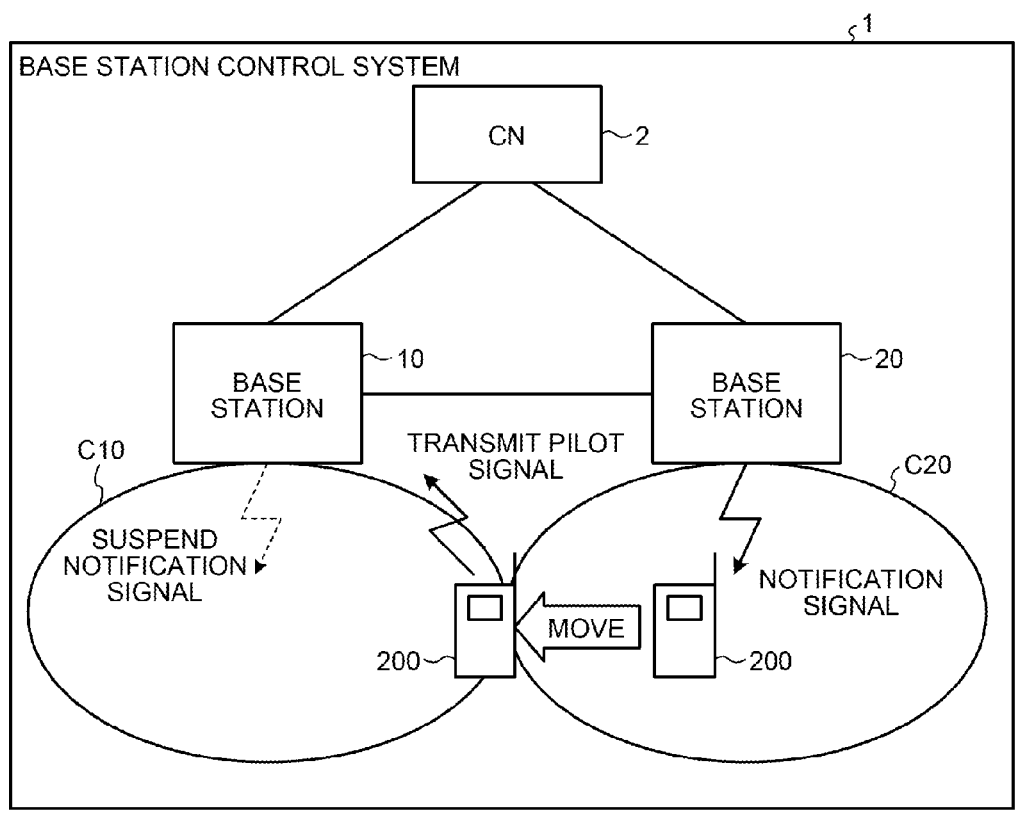
FIG. 9 is a diagram illustrating an overall configuration of the base station control system when the mobile station moves in the embodiment.

FIG. 9 is a diagram illustrating an overall configuration of the base station control system 1 when the mobile station 200 moves in the embodiment. As illustrated in FIG. 9, if the mobile station 200 moves and the reception quality from the base station 20 being in communication decreases due to the movement, the mobile station 200 attempts to perform a handover to the other neighboring base station 10. However, because the base station 10 is in the power-saving state, the mobile station 200 is unable to maintain the wireless communication in the current state. Therefore, the mobile station 200 transmits a pilot signal to the base station 10 serving as a handover destination in order to newly start communication with the base station 10. The base station 10, upon detecting reception of the pilot signal as described above, causes the power control unit 12c to turn on the power supply of each of the blocks of the PA 11a, the TX 11b, the RRH transmission interface unit 12a, and the modulating unit 12a-1, and starts transmission of the notification signal. Therefore, the mobile station 200 becomes enabled to perform a handover from the base station 20 to the base station 10 and can maintain the wireless communication.

As described above, the base station 10 suspends transmission of the notification signal during a time in which the traffic volume is low, so that it is possible to suppress transmission of unnecessary notification signals and reduce power consumption. In particular, even in the base stations 10 and 20 that are densely arranged, the power-saving states are maintained appropriately, so that it becomes possible to reduce the power consumption of the base stations 10 and 20.

First Modification

Next, a first modification will be described. A trigger for a base station of the first modification to return from the power-saving state to the normal state differs from that of the base station of the above described embodiment. Specifically, while the base station according to the embodiment cancels the power-saving state by being triggered by reception of a pilot signal from a mobile station, the base station according to the first modification cancels the power-saving state by being triggered by reception of a paging signal from a different base station. Hereinafter, differences from the embodiment will be mainly described.

Figure 10:
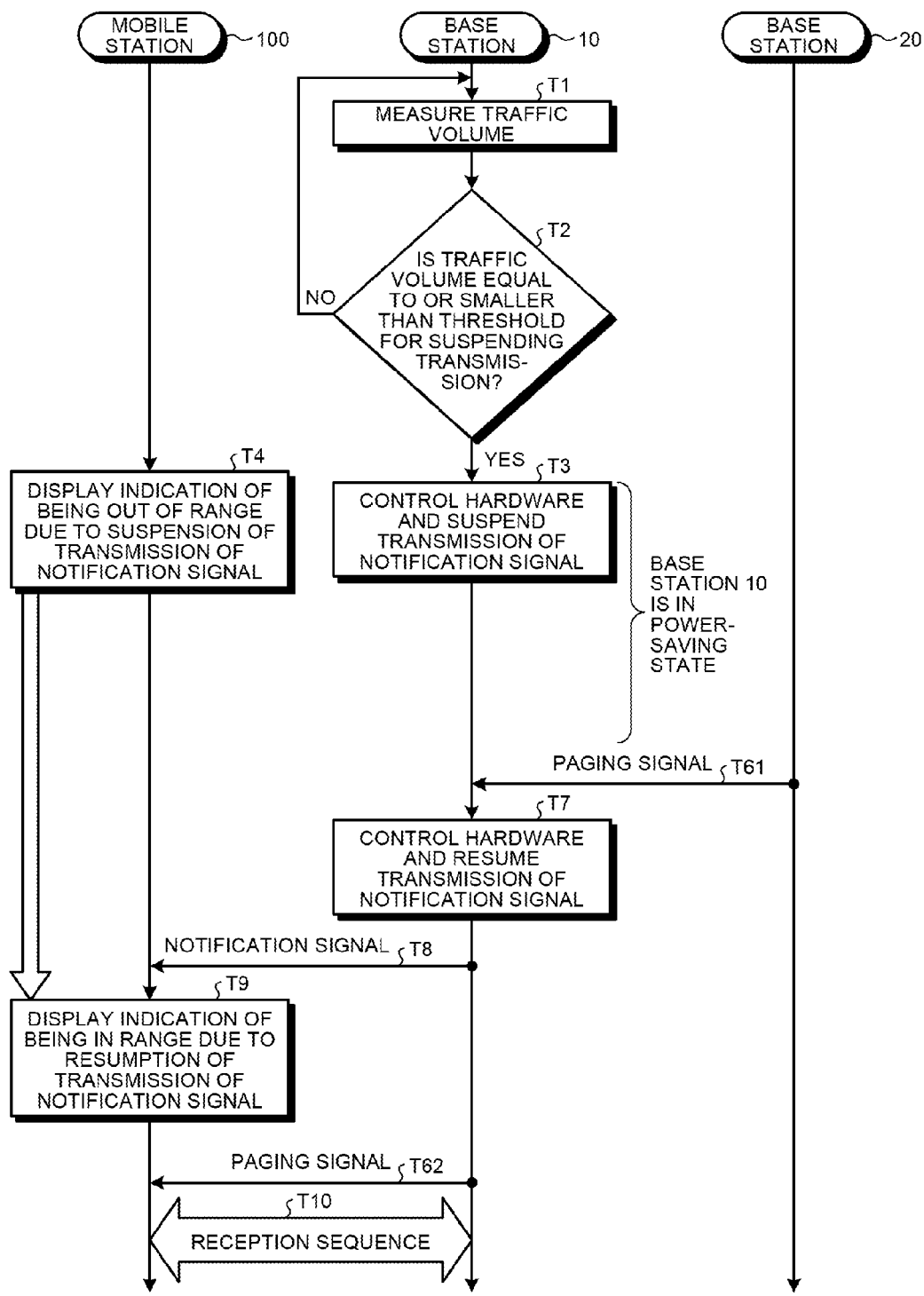
FIG. 10 is a flowchart for explaining operation of a base station control system according to a first modification.

The configurations of a base station and a mobile station according to the first modification are the same as the configurations of the base station and the mobile station according to the embodiment. Therefore, in the first modification, the same components as those of the embodiment are denoted by the same reference symbols, and illustration and detailed explanation thereof will be omitted. FIG. 10 is a flowchart for explaining operation of the base station control system 1 according to the first modification. FIG. 10 includes a plurality of the same processes as those in FIG. 6 that is referred to in the description of the operation according to the embodiment; therefore, the same Steps are denoted by reference symbols with the same ends, and detailed explanation thereof will be omitted. Specifically, processes at Steps T1 to T4, T61, and T7 to T10 in FIG. 10 correspond to the processes at Steps S1 to S4, S6, and S7 to S10 illustrated in FIG. 6, respectively.

When there is incoming communication to the mobile station 100, a CNIF unit 23e of the base station 20 transmits a paging signal to the base station 10 that is in the power-saving state (Step T61). The base station 10 enters the normal state from the power-saving state (wakes up) by using the reception of the paging signal as a trigger. The TX 11b of the base station 10 that has entered the normal state transmits a notification signal to the mobile station 100 (Step T8), and thereafter transfers the paging signal to the mobile station 100 on which indication of being in range is displayed (Step T62). Consequently, the mobile station 100 is enabled to perform a reception sequence with the base station 10 (Step T10).

Figure 11:
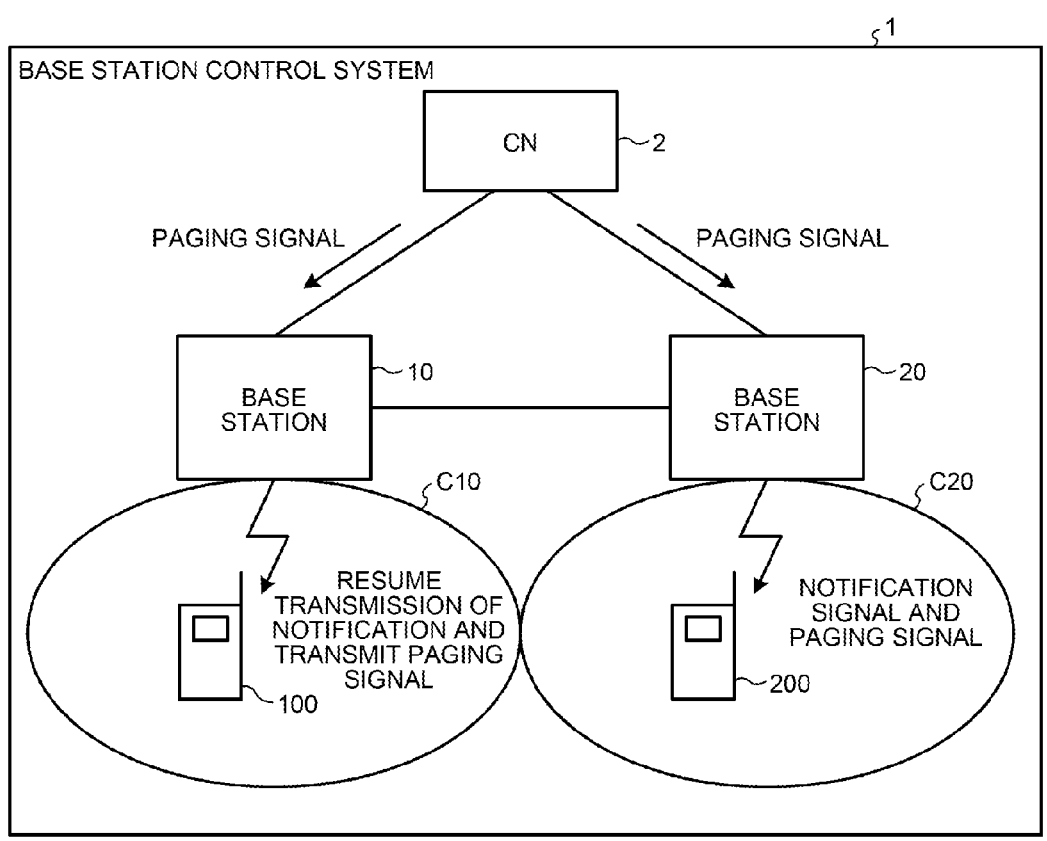
FIG. 11 is a diagram illustrating an overall configuration of the base station control system when the mobile station receives communication in the first modification.

FIG. 11 is a diagram illustrating an overall configuration of the base station control system 1 when there is incoming communication to the mobile station 100 in the first modification. As illustrated in FIG. 11, when there is incoming communication from the other mobile station 200 to the mobile station 100 located in the cell C10 of the base station 10 that has suspended the transmission of the notification signal, the base station 10 resumes the suspended transmission of the notification signal, and notifies the mobile station 100 of the incoming communication by using the paging signal.

As described above, in the reception sequence, unlike the transmission sequence, the paging signal serves as a wake-up signal, instead of the pilot signal. According to the base station 10 of the first modification, it is possible to reduce the power consumption of the base station 10 not only in the transmission sequence but also in the reception sequence with the mobile station 100. Further, even when there is incoming communication to the mobile station 100 located in the cell C10 of the base station 10 that is in the power-saving state, the mobile station 100 can promptly detect the incoming communication in the same manner as being located in the cell C20 of the base station 20 that is in the normal state.

Second Modification

Next, a second modification will be described. In the second modification, the number of base stations that receive pilot signals transmitted by a mobile station differs from that of the above described embodiment. Specifically, while a single base station receives a pilot signal from a mobile station in the base station control system according to the embodiment, a plurality of base stations receive pilot signals from a mobile station in a base station control system according to the second modification. Hereinafter, differences from the embodiment will be mainly described.

Figure 12:
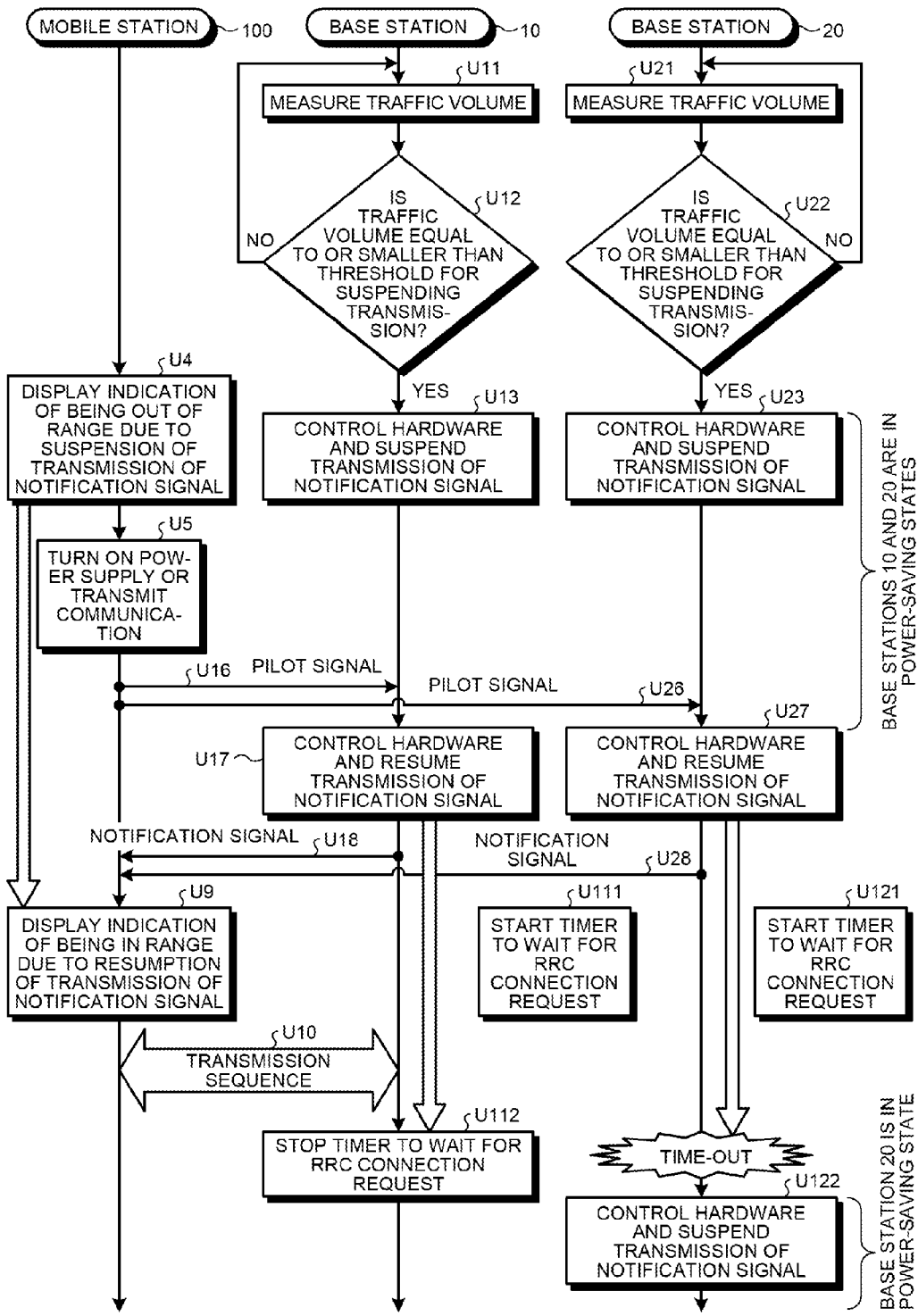
FIG. 12 is a flowchart for explaining operation of a base station control system according to a second modification.

The configurations of a base station and a mobile station according to the second modification are the same as the configurations of the base station and the mobile station according to the embodiment. Therefore, in the second modification, the same components as those of the embodiment are denoted by the same reference symbols, and illustration and detailed explanation thereof will be omitted. FIG. 12 is a flowchart for explaining operation of the base station control system 1 according to the second modification. FIG. 12 includes a plurality of the same processes as those in FIG. 6 that is referred to in the description of the operation according to the embodiment; therefore, the same Steps are denoted by reference symbols with the same ends, and detailed explanation thereof will be omitted. Specifically, processes at Steps U11 to U13, U21 to U23, U4, U5, U16 to U18, U26 to U28, U9, and U10 in FIG. 12 correspond to the processes at Steps S1 to S3, S4, S5, S6 to S8, S9, and S10 illustrated in FIG. 6, respectively.

The base stations 10 and 20, upon receiving pilot signals transmitted by the mobile station 100, cause predetermined hardware (for example, the PA 11a and a PA 21a, the TX 11b and a TX 21b, the RRH transmission interface unit 12a and an RRH transmission interface unit 22a, and the modulating unit 12a-1 and a modulating unit 22a-1) to turn on the power supply, and resumes the transmission of the notification signal (Steps U17 and U27). Accordingly, the main control unit 13a and a main control unit 23a start radio resource control (RRC) connection request timers and wait for an RRC connection request transmitted by the mobile station 100 (Steps U111 and U121).

Subsequently, the mobile station 100 selects a base station that serves as a transmission destination of the RRC connection request from among the base stations 10 and 20 serving as the transmission sources of the notification signals. For example, the mobile station 100 preferentially selects a base station that provides a higher reception quality of the notification signal. In the second modification, the reception quality of the notification signal from the base station 10 is higher than the reception quality of the notification signal from the base station 20; therefore, the base station 10 is selected as the transmission destination of the RRC connection request. Therefore, the mobile station 100 transmits the RRC connection request to the base station 10 in the transmission sequence at Step U10.

The main control unit 13a of the base station 10, upon detecting reception of the RRC connection request, stops the RRC connection request timer activated at Step U111 (Step U112), and controls communication with the mobile station 100. Meanwhile, the base station 20 does not receive the RRC connection request, so that the RRC connection request timer activated at Step U121 times out with a lapse of a predetermined time. At Step U122, similarly to Step U23, a power control unit 22c of the base station 20 causes predetermined hardware (for example, the PA 21a, the TX 21b, the RRH transmission interface unit 22a, and the modulating unit 22a-1) to turn off the power supply or to enter the sleep state, and suspends transmission of the notification signal. Consequently, the base station 20 enters the power-saving state again.

As described above, when the base stations 10 and 20 receive the pilot signals, only the base station 10 that the mobile station 100 has selected as the transmission destination of the RRC connection request from among the base stations 10 and 20 continues to transmit the notification signal. The base station 20, to which the mobile station 100 has not transmitted the RRC connection request, returns to the power-saving state after a lapse of a predetermined time (times out) since the resumption of the transmission of the notification signal. Therefore, the number of the base stations that return from the power-saving state to the normal state can be minimized, and transmission of unnecessary notification signals can be prevented. As a result, it is possible to reduce power consumption.

Third Modification

Next, a third modification will be described. In the third modification, a method of selecting a base station that returns from the power-saving state to the normal state differs from that of the above described second modification. Specifically, while a base station that has received the RRC connection request from a mobile station is selected as a base station that returns to the normal state in the base station control system according to the second modification, a base station with the highest priority is selected in a base station control system according to the third modification. Hereinafter, differences from the second modification will be mainly described.

Figure 13:
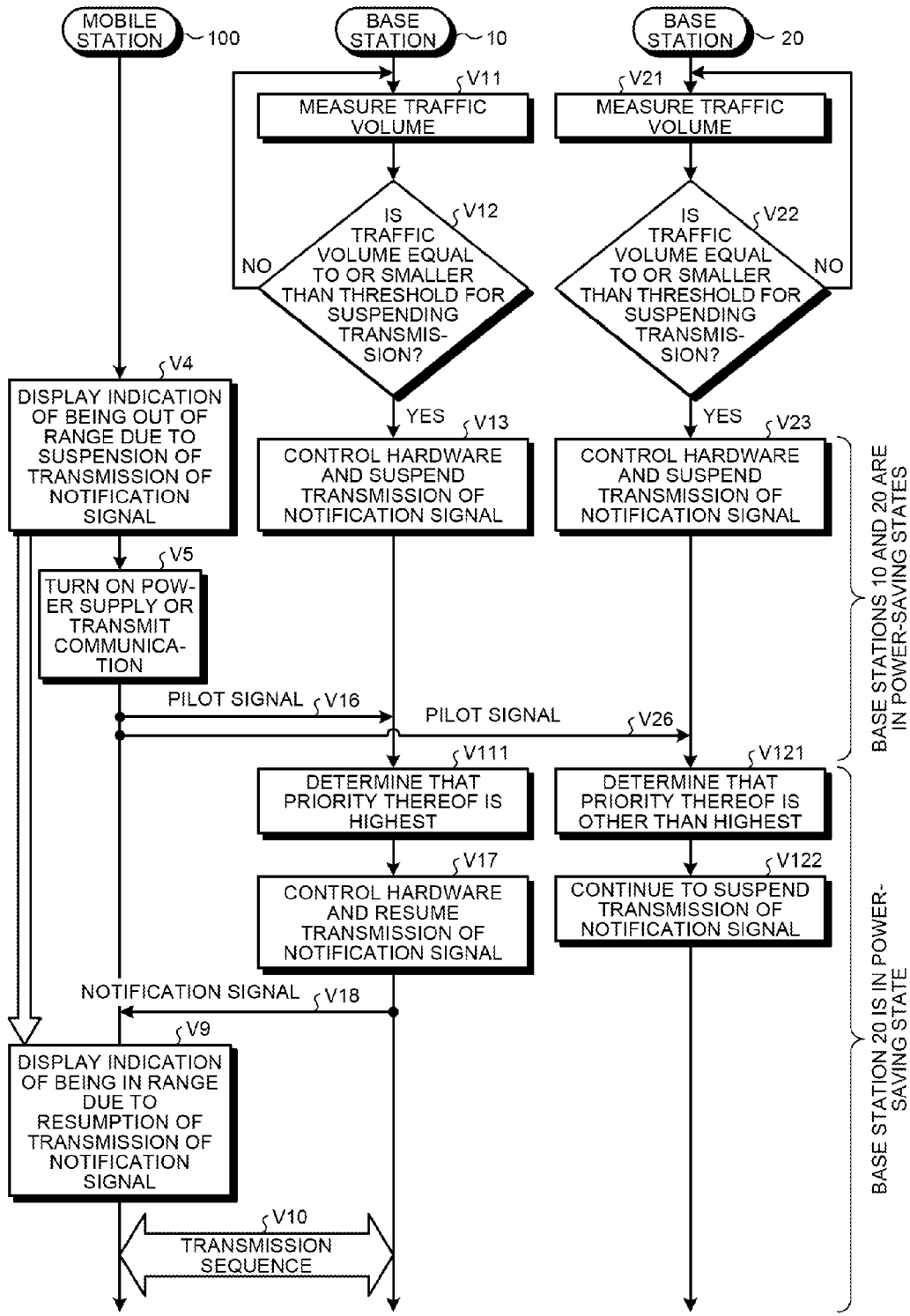
FIG. 13 is a flowchart for explaining operation of a base station control system according to a third modification.

The configurations of a base station and a mobile station according to the third modification are the same as the configurations of the base station and the mobile station according to the second modification. Therefore, in the third modification, the same components as those of the second modification are denoted by the same reference symbols, and illustration and detailed explanation thereof will be omitted. FIG. 13 is a flowchart for explaining operation of the base station control system 1 according to the third modification. FIG. 13 includes a plurality of the same processes as those in FIG. 12 that is referred to in the description of the operation according to the second modification; therefore, the same Steps are denoted by reference symbols with the same ends, and detailed explanation thereof will be omitted. Specifically, processes at Steps V11 to V13, V21 to V23, V4, V5, V16, V26, V17, V18, V9, and V10 in FIG. 13 correspond to the processes at Steps U11 to U13, U21 to U23, U4, U5, U16, U26, U17, U18, U9, and U10 illustrated in FIG. 12, respectively.

The base stations 10 and 20, upon receiving the pilot signals transmitted by the mobile station 100, cause the state change determining unit 13b and a state change determining unit 23b to refer to the priority management information DB 13c and a priority management information DB 23c, respectively. In the priority management information DBs 13c and 23c, priorities of neighboring base stations (for example, the base stations 10 and 20) grouped in advance are set. The priorities indicate the order of priority to determine which of the base stations in the group is to be shifted from the power-saving state to the normal state. Therefore, the state change determining unit 13b of the base station 10 can determine whether the base station 10 has the highest priority in the group by referring to the priority management information DB 13c. Similarly, the state change determining unit 23b of the base station 20 can determine whether the base station 20 has the highest priority in the group by referring to the priority management information DB23c.

Meanwhile, each of the base stations 10 and 20 may cause each of the state change determining units 13b and 23b to determine whether there is a base station that has received the pilot signal in the same group before determining the priority in the group. As a result of the determination, only if there is a base station that has received the pilot signal in addition to the subject base station, each of the base stations 10 and 20 may determine whether the priority thereof in the group is higher than the priority of the other base station in the group, that is, whether to return to the normal state.

In the third modification, the highest priority is given to the base station 10 among the base stations in the group; therefore, the state change determining unit 13b of the base station 10 determines that the priority of the base station 10 in the group is the highest (Step V111). Then, the power control unit 12c of the base station 10 causes predetermined hardware (for example, the PA 11a, the TX 11b, the RRH transmission interface unit 12a, and the modulating unit 12a-1) to turn on the power supply, and resumes the transmission of the notification signal (Step V17).

Meanwhile, at Step V121, the state change determining unit 23b of the base station 20 determines that the priority of the base station 20 in the group is other than the highest (for example, the second highest). Then, the power control unit 22c of the base station 20 continues to suspend the transmission of the notification signal that has been started at Step V23 (Step V122).

As described above, the base station 10 includes the RX 11c, the state change determining unit 13b, the power control unit 12c, and the TX 11b. The RX 11c receives a connection request signal (for example, a pilot signal) from the mobile station 100 when the base station 10 is in the power-saving state. The state change determining unit 13b, when the RX 11c receives the connection request signal, determines whether the priority of the base station 10 is higher than the priority of the other base station 20 that belongs to the same group as the base station 10. The power control unit 12c, when the state change determining unit 13b determines that the priority of the base station 10 is higher than the priority of the other base station 20, causes the base station 10 to return from the power-saving state to the normal state. The TX 11b wirelessly transmits the notification signal to the mobile station 100 after the base station 10 is returned to the normal state by the power control unit 12c. Further, the state change determining unit 13b may determine whether there is the other base station 20 that has received the connection request signal in the group, and when there is the other base station 20, may determine whether the priority of the base station 10 is higher than the priority of the other base station 20.

Incidentally, the connection request signal as described above is, for example, a pilot signal that is transmitted by the mobile station 100 in accordance with power-on (activation of the power supply) of the mobile station 100 or outgoing communication from the mobile station 100. Further, the connection request signal as described above may be a pilot signal that is transmitted by the mobile station 100 in accordance with a handover to the base station 10 by the mobile station 100. Furthermore, the connection request signal as described above may be a pilot signal that is transmitted by the other base station 20 in accordance with incoming communication to the mobile station 100 located in the area of the base station 10 that is in the power-saving state.

As described above, in the base station control system 1 according to the third modification, a plurality of the base stations are grouped in advance, and when the base stations 10 and 20 receive pilot signals, only the base station 10 with the highest priority is returned to the normal state based on the priority in the group. Therefore, the other base station 20 with a lower priority maintains the once-started power-saving state regardless of whether the pilot signal is received. Therefore, the number of the base stations that return from the power-saving state to the normal state can be minimized, and transmission of unnecessary notification signals can be prevented. Consequently, it becomes possible to reduce power consumption.

Further, unlike the second modification, the base station 20 maintains the power-saving state after Step V23 in FIG. 13 without temporarily returning to the normal state; therefore, it becomes possible to further save power. Furthermore, even in the mobile station 100, the mobile station 100 does not receive the notification signals from a plurality of the base stations 10 and 20, so that a process of selecting a base station to be a party of the communication is not needed, and load on the mobile station 100 can be reduced.

The priorities in the group, which are assigned to the base stations in advance, may be in the arbitrary order, or may be, for example, in the order from the greatest cell, in the order from the highest frequency band, or in the order from the greatest surrounding environment (for example, presence or absence of shielding objects or reflection objects). Further, the priorities in the group need not necessarily be fixed, but may be dynamically changed depending on, for example, a distance to the mobile station 100, a reception quality, a radio wave strength, presence or absence of interference, a time, or the like.

Fourth Modification

Next, a fourth modification will be described. In the fourth modification, a base station that executes a transmission sequence with a mobile station differs from that of the above described third modification. Specifically, while a base station with the highest priority in a group executes the transmission sequence with a mobile station in the base station control system according to the third modification, a base station with the second highest priority executes a transmission sequence in a base station control system according to the fourth modification. Hereinafter, differences from the third modification will be mainly described.

The configurations of a base station and a mobile station according to the fourth modification are the same as the configurations of the base station and the mobile station according to the third modification. Therefore, in the fourth modification, the same components as those of the third modification are denoted by the same reference symbols, and illustration and detailed explanation thereof will be omitted.

Figure 14:
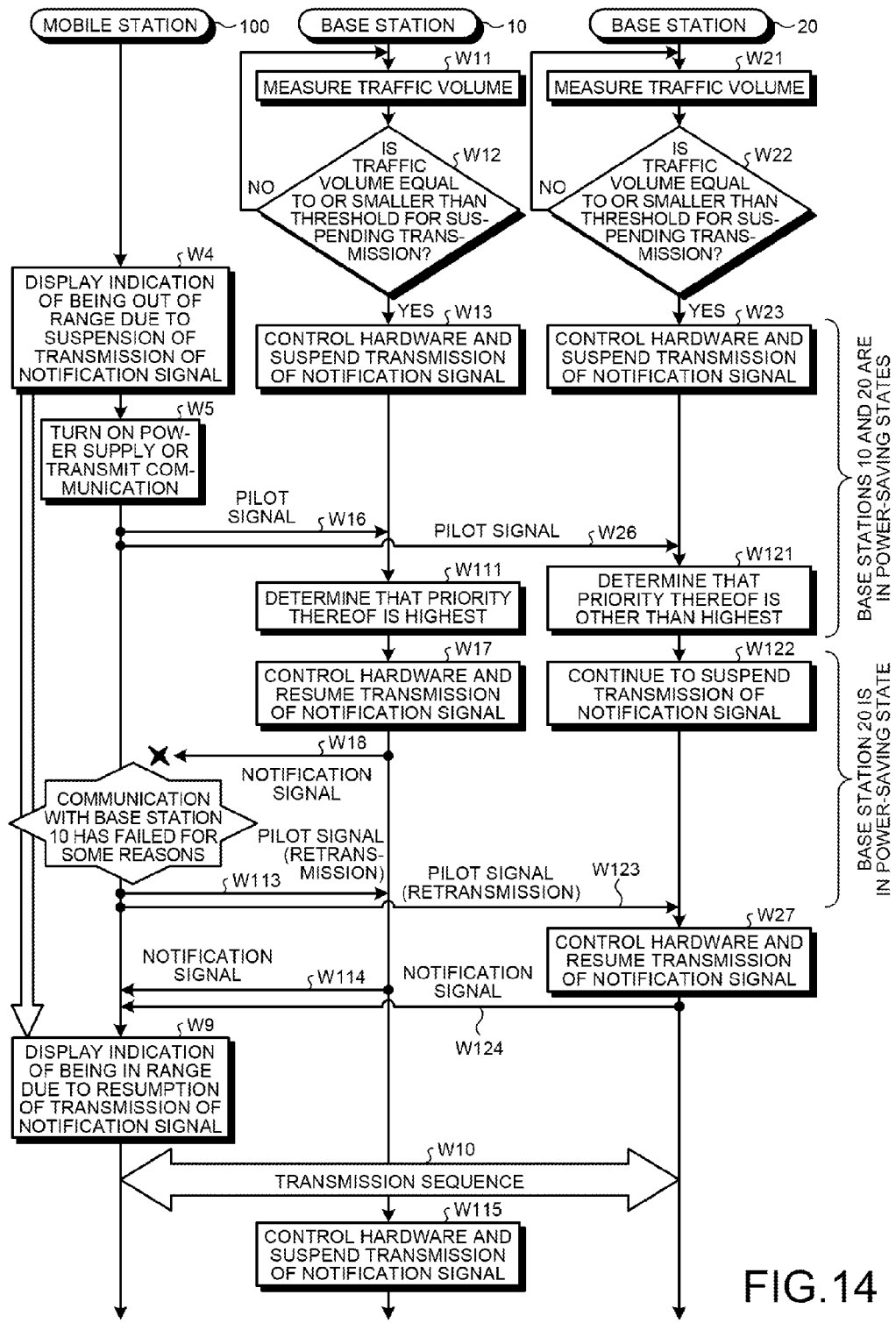
FIG. 14 is a flowchart for explaining operation of a base station control system according to a fourth modification.

FIG. 14 is a flowchart for explaining operation of the base station control system 1 according to the fourth modification. FIG. 14 includes a plurality of the same processes as those in FIG. 13 that is referred to in the description of the operation according to the third modification; therefore, the same Steps are denoted by reference symbols with the same ends, and detailed explanation thereof will be omitted. Specifically, processes at Steps W11 to W13, W21 to W23, W4, W5, W16, W26, W17, W18, W9, and W10 in FIG. 14 correspond to the processes at Steps V11 to V13, V21 to V23, V4, V5, V16, V26, V17, V18, V9, and V10 illustrated in FIG. 13, respectively. Further, processes at Steps W111, W121, and W122 in FIG. 14 correspond to the processes at Steps V111, V121, V122 illustrated in FIG. 13, respectively.

At Step W17, the power control unit 12c of the base station 10 causes predetermined hardware (for example, the PA 11a, the TX 11b, the RRH transmission interface unit 12a, and the modulating unit 12a-1) to turn on the power supply, and resumes the transmission of the notification signal. However, the notification signal may not reach the mobile station 100 for some reasons, such as a radio wave state or a communication load (Step W18). In this case, the mobile station 100 detects that the notification signal has not been received from any of the base stations after a lapse of a predetermined time since the transmission of the pilot signals (Steps W16 and W26), and retransmits the pilot signals (Steps W113 and W123).

At Step W27, the power control unit 22c of the base station 20, upon detecting reception of the pilot signal transmitted at Step W23 as described above, causes predetermined hardware (for example, the PA 21a, the TX 21b, the RRH transmission interface unit 22a, and the modulating unit 22a-1) to turn on the power supply, and resumes the transmission of the notification signal. The base station 20 is notified by the base station 10 in advance that the base station 10 has failed to transmit the notification signal, or the base station 20 detects that the same mobile station 100 has retransmitted the pilot signal within a certain time instead of receiving the notification from the base station 10; therefore, the base station 20 can detect that the base station 20 with the second highest priority serves as a base station that needs to return from the power-saving state to the normal state. Therefore, the base station 20 transmits the notification signal after entering the normal state (Step W124).

Meanwhile, the base station 10 transmits the notification signal upon reception of the pilot signal retransmitted at Step W113, similarly to the base station (Step W114). However, the base station 10 returns to the power-saving state again upon detecting, from the base station 20, that a transmission sequence is established between the mobile station 100 and the base station 20 or upon failing to receive the RRC connection request within a predetermined time since the transmission of the notification signal (time-out). Specifically, the power control unit 12c of the base station 10 causes predetermined hardware (for example, the PA 11a, the TX 11b, the RRH transmission interface unit 12a, and the modulating unit 12a-1) to turn off the power supply or to enter the sleep state, and suspends the transmission of the notification signal (Step W115).

Meanwhile, the base station 10 has failed to transmit the notification signal at Step W18; therefore, the base station 10 may enter the power-saving state (Step W115) without retransmitting the notification signal at Step W114 after detecting the failure of the transmission.

As described above, even when any communication failure occurs between the base station 10 and the mobile station 100, the base station control system 1 according to the fourth modification can promptly and reliably resume communication between the base station 20 and the mobile station 100 while saving the power of each of the base stations 10 and 20. Therefore, the reliability of the base station control system 1 can be improved.

Fifth Modification

Next, a fifth modification will be descried. In the fifth modification, a method of selecting a base station that returns from the power-saving state to the normal state differs from that of the above described third modification. Specifically, while a base station with the highest priority in the group is selected as a base station that returns to the normal state in the base station control system according to the third modification, a base station with the greatest reception state is selected in a base station control system according to the fifth modification. Hereinafter, differences from the third modification will be mainly described.

Figure 15:
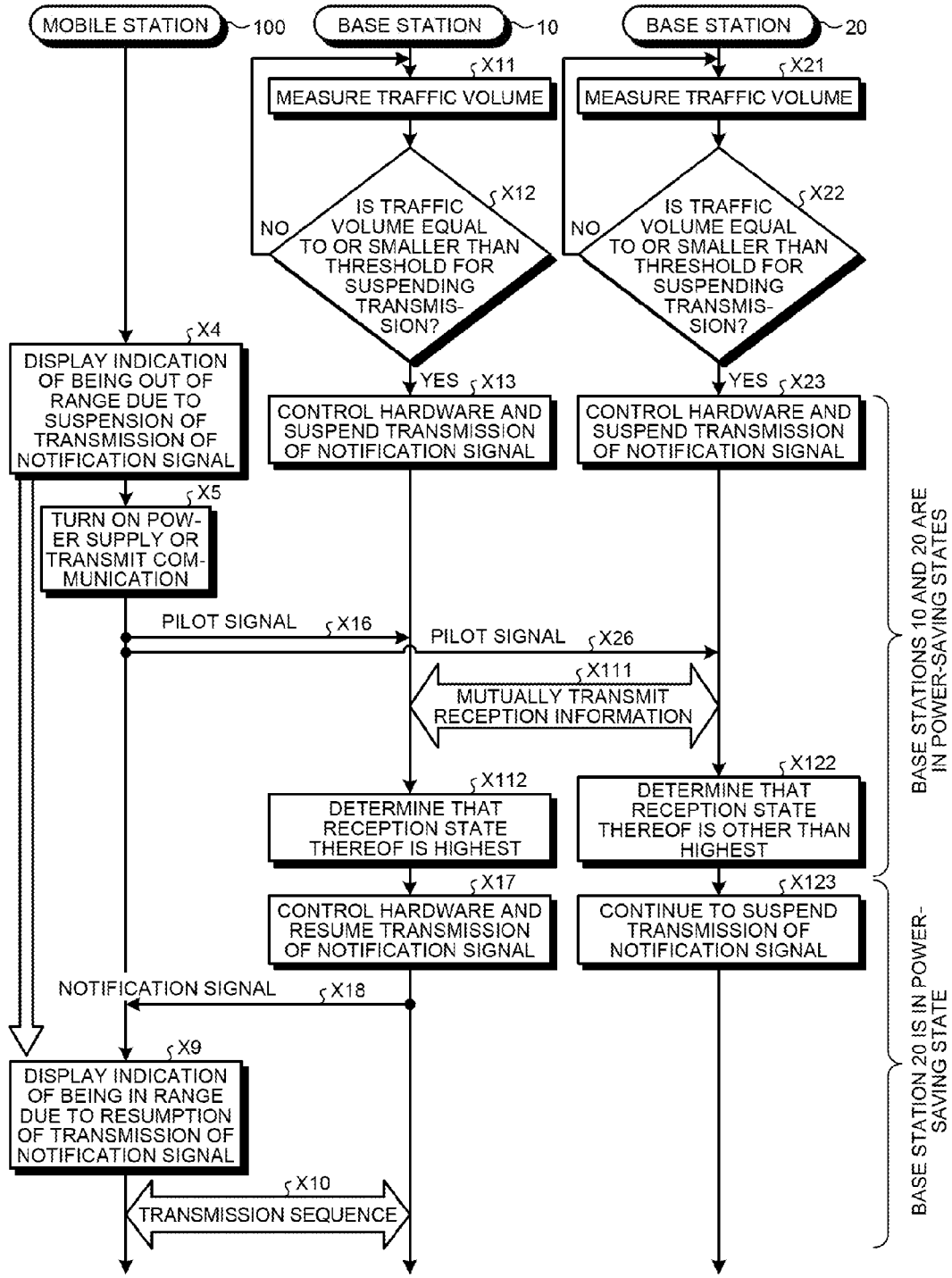
FIG. 15 is a flowchart for explaining operation of a base station control system according to a fifth modification.

The configurations of a base station and a mobile station according to the fifth modification are the same as the configurations of the base station and the mobile station according to the third modification. Therefore, in the fifth modification, the same components as those of the third modification are denoted by the same reference symbols, and illustration and detailed explanation thereof will be omitted. FIG. 15 is a flowchart for explaining operation of the base station control system 1 according to the fifth modification. FIG. 15 includes a plurality of the same processes as those in FIG. 13 that is referred to in the description of the operation according to the third modification; therefore, the same Steps are denoted by reference symbols with the same ends, and detailed explanation thereof will be omitted. Specifically, processes at Steps X11 to X13, X21 to X23, X4, X5, X16, X26, X17, X18, X9, and X10 in FIG. 15 correspond to the processes at Steps V11 to V13, V21 to V23, V4, V5, V16, V26, V17, V18, V9, and V10 illustrated in FIG. 13, respectively.

The base stations 10 and 20, upon receiving the pilot signals transmitted by the mobile station 100, cause the state change determining units 13b and 23b to refer to the reception state management information DBs 13d and 23d, respectively. The reception state management information DBs 13d and 23d store therein information indicating reception states of neighboring base stations (for example, the base stations 10 and 20). The reception states are information serving as an index to determine which of the base stations is to be shifted from the power-saving state to the normal state, and is the reception quality of the pilot signal, for example.

However, each of the base stations 10 and 20 may use a reception time or a radio wave strength of the pilot signal instead of the reception quality. When the reception quality is used, a base station is selected in order from the greatest quality. Alternatively, when the reception time is used for example, a base station is selected in order from the earliest time. When the radio wave strength is used, a base station is selected in order from the highest strength. The state change determining unit 13b of the base station 10 can determine whether the reception state of the base station 10 is the greatest by referring to the reception state management information DB 13d. Similarly, the state change determining unit 23b of the base station 20 can determine whether the reception state of the base station 20 is the greatest by referring to the reception state management information DB 23d.

The base stations 10 and 20, upon receiving the pilot signals from the mobile station 100 (Steps X16 and X26), cause the CNIF units 13e and 23e to mutually transmit and receive information indicating the reception states of the pilot signals (Step X111). In the fifth modification, the reception state of the base station 10 is the greatest among the base stations 10 and 20; therefore, the state change determining unit 13b of the base station 10 determines that the reception state of the base station 10 is the greatest (Step X112). Then, the power control unit 12c of the base station 10 causes predetermined hardware (for example, the PA 11a, the TX 11b, the RRH transmission interface unit 12a, and the modulating unit 12a-1) to turn on the power supply, and resumes the transmission of the notification signal (Step X17).

Meanwhile, at Step X122, the state change determining unit 23b of the base station 20 determines that the reception state of the base station 20 is other than the greatest (for example, the second highest). Then, the power control unit 22c of the base station 20 continues to suspend the transmission of the notification signal that has been started at Step X23 (Step X123).

As described above, in the base station control system 1 according to the fifth modification, when the base stations 10 and 20 receive the pilot signals, the base stations 10 and 20 refer to the reception states thereof and only the base station 10 with the greatest reception state returns to the normal state. Therefore, the other base station 20, the reception state of which is not good, maintains the once-started power-saving state regardless of whether the pilot signal is received. Therefore, the number of the base stations that return from the power-saving state to the normal state can be minimized and transmission of unnecessary notification signals can be prevented. Consequently, it becomes possible to reduce power consumption.

Further, as compared to the second modification, the base station 20 maintains the power-saving state after Step X23 in FIG. 15 without temporarily returning to the normal state; therefore, it becomes possible to further save power. Furthermore, even in the mobile station 100, the mobile station 100 does not receive the notification signals from the base stations 10 and 20, so that a process of selecting a base station to be a party of the communication is not needed, and load on the mobile station 100 can be reduced.

Incidentally, in the fifth modification, the reception state for determining a base station that returns to the normal state is a reception state of the pilot signal that is an uplink signal. However, the reception state is not limited to the reception state of signals of uplink, but may be a reception state of a downlink signal (the reception state of the mobile station 100).

Sixth Modification

Next, a sixth modification will be described. In the sixth modification, a base station that executes a transmission sequence with a mobile station differs from that of the above described fifth modification. Specifically, while a base station with the greatest reception state at the time of receiving the first pilot signal executes the transmission sequence with a mobile station in the base station control system according to the fifth modification, a base station with the greatest reception state at the time of receiving the retransmitted pilot signal executes the transmission sequence in a base station control system according to the sixth modification. Hereinafter, differences from the fifth modification will be mainly described.

Figure 16:
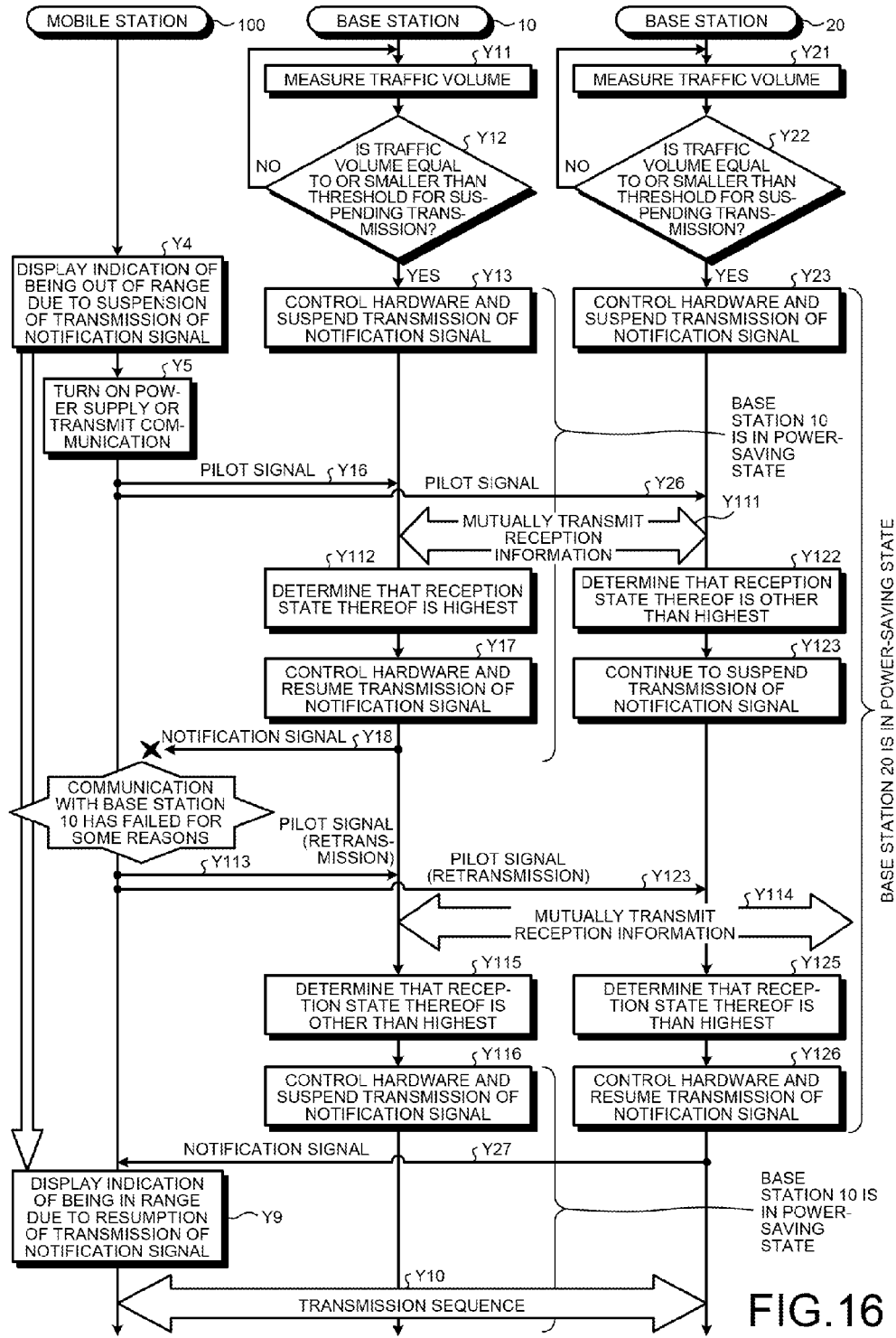
FIG. 16 is a flowchart for explaining operation of a base station control system according to a sixth modification.

The configurations of a base station and a mobile station according to the sixth modification are the same as the configurations of the base station and the mobile station according to the fifth modification. Therefore, in the sixth modification, the same components as those of the fifth modification are denoted by the same reference symbols, and illustration and detailed explanation thereof will be omitted. FIG. 16 is a flowchart for explaining operation of the base station control system 1 according to the sixth modification. FIG. 16 includes a plurality of the same processes as those in FIG. 15 that is referred to in the description of the operation according to the fifth modification; therefore, the same Steps are denoted by reference symbols with the same ends, and detailed explanation thereof will be omitted.

Specifically, processes at Steps Y11 to Y13, Y21 to Y23, Y4, Y5, Y16, Y26, Y17, Y18, Y9, and Y10 in FIG. 16 correspond to the processes at Steps X11 to X13, X21 to X23, X4, X5, X16, X26, X17, X18, X9, and X10 illustrated in FIG. 15, respectively. Further, processes at Steps Y111, Y112, Y122, and Y123 illustrated in FIG. 16 correspond to the processes at Steps X111, X112, X122, and X123 illustrated in FIG. 15, respectively. Furthermore, processes at Steps Y113, Y123, Y114, Y115, Y116, Y125, Y126, and Y27 illustrated in FIG. 16 correspond to the processes at Steps X16, X26, X111, X122, X23, X112, X17, and X18 illustrated in FIG. 15, respectively.

At Step Y17, the power control unit 12c of the base station 10 causes predetermined hardware (for example, the PA 11a, the TX 11b, the RRH transmission interface unit 12a, and the modulating unit 12a-1) to turn on the power supply, and resumes the transmission of the notification signal. However, the notification signal may not reach the mobile station 100 for some reasons, such as a radio wave state or a communication load (Step Y18). In this case, the mobile station 100 detects that the notification signal has not been received from any of the base stations after a lapse of a predetermined time since the transmission of the pilot signals (Steps Y16 and Y26), and retransmits the pilot signals (Steps Y113 and Y123).

The base stations 10 and 20, upon receiving the pilot signals from the mobile station 100 (Steps Y113 and Y123), cause the CNIF units 13e and 23e to mutually transmit and receive information indicating the reception states of the pilot signals (Step Y114). At this time, unlike the time point at Step Y111 as described above, the base station with the greatest reception state has been changed from the base station 10 to the base station 20. Therefore, the state change determining unit 13b of the base station 10 determines that the reception state of the base station 10 is other than the greatest (for example, the second greatest) (Step Y115). Then, the power control unit 12c of the base station 10 causes predetermined hardware (for example, the PA 11a, the TX 11b, the RRH transmission interface unit 12a, and the modulating unit 12a-1) to turn off the power supply or enter the sleep state, and suspends the transmission of the notification signal (Step Y116).

Meanwhile, at Step Y125, the state change determining unit 23b of the base station 20 determines that the reception state of the base station 20 is the greatest. Then, the power control unit 22c of the base station 20 causes predetermined hardware (for example, the PA 21a, the TX 21b, the RRH transmission interface unit 22a, and the modulating unit 22a-1) to turn on the power supply, and resumes the transmission of the notification signal (Step Y126).

As described above, even when any communication failure occurs between the base station 10 and the mobile station 100, the base station control system 1 according to the sixth modification can promptly and reliably resume communication between the base station 20 and the mobile station 100 while saving the power of each of the base stations 10 and 20. Therefore, the reliability of the base station control system 1 can be improved.

Incidentally, even in the sixth modification, each of the base stations 10 and 20 may use a reception time or a radio wave strength of the pilot signal instead of the reception quality. When the reception quality is used, a base station with a greater reception quality is preferentially selected as a party of the communication with the mobile station 100. Alternatively, when the reception time is used for example, a base station with an earlier reception time is preferentially selected. When the radio wave strength is used, a base station with a grater radio wave strength is preferentially selected.

Figure 17:
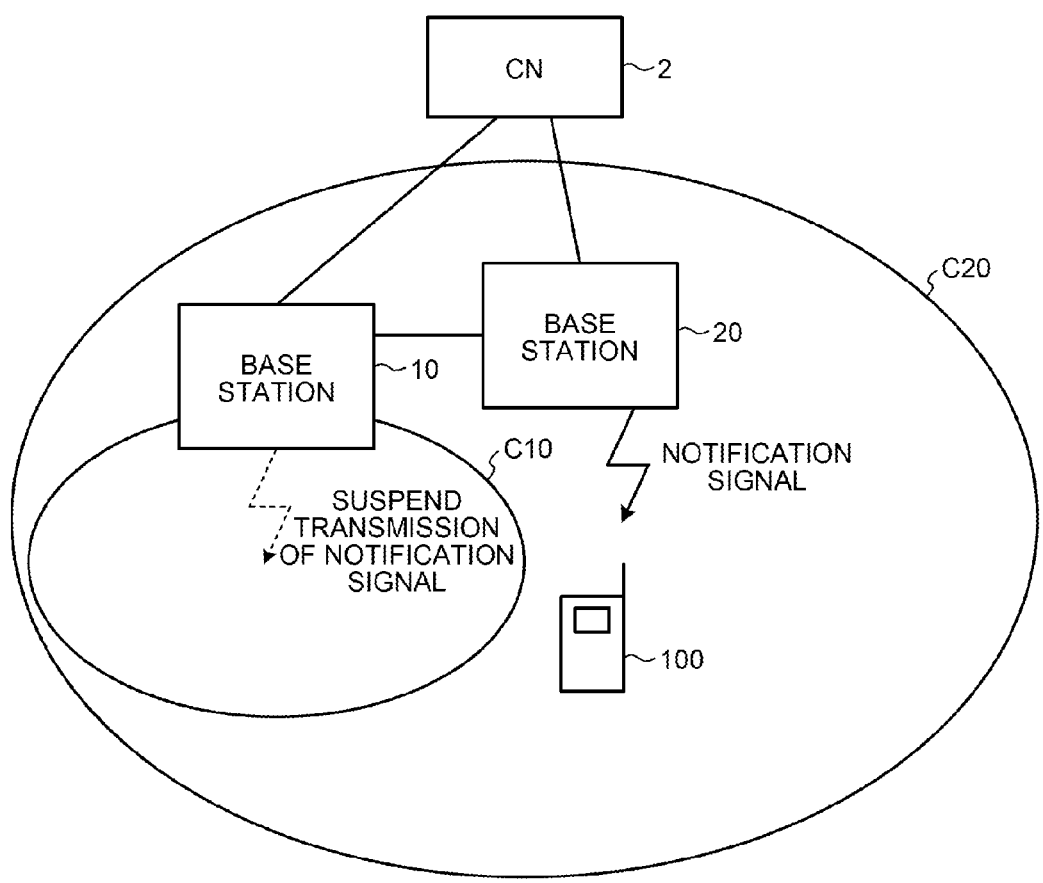
FIG. 17 is a diagram illustrating an arrangement example of base stations when a small cell and a macro cell are mixed.

In the embodiment and each of the modifications as described above, the base stations 10 and 20 respectively form the cells C10 and C20 that do not overlap each other. However, the positional relationship of the cells C10 and C20 is not limited to that illustrated in FIG. 1. FIG. 17 is a diagram illustrating an arrangement example of base stations when the small cell C10 and the macro cell C20 are mixed. As illustrated in FIG. 17, the whole or part of the small cell C10 may or may not be encompassed by the macro cell C20.

Figure 18:
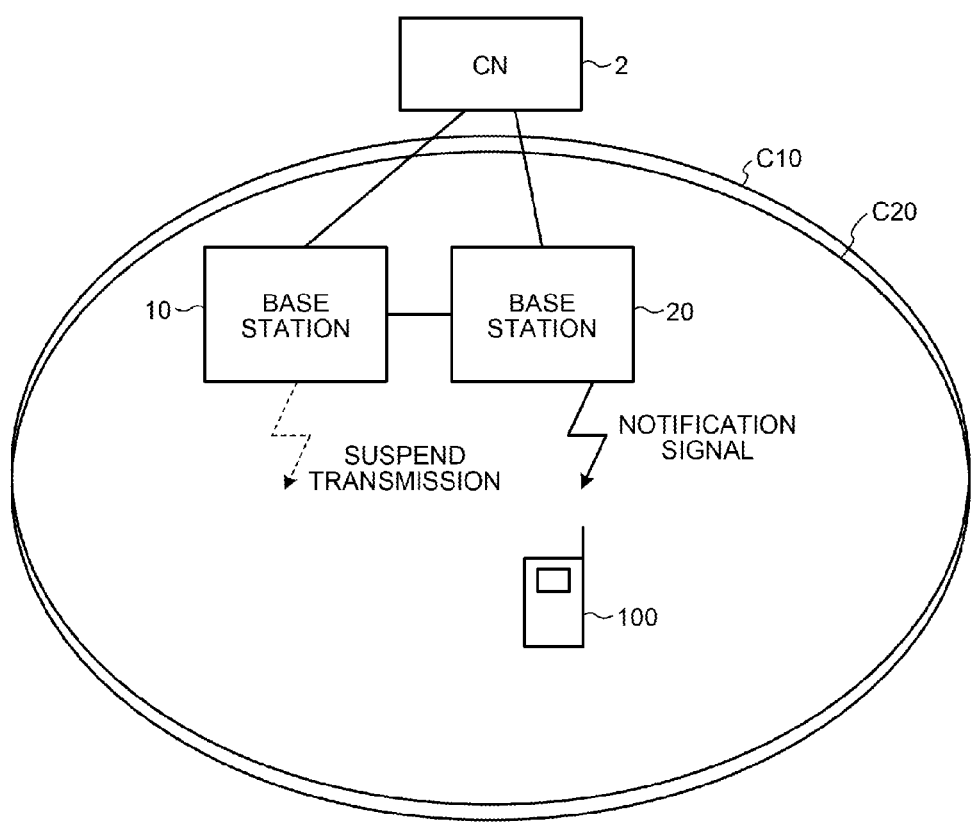
FIG. 18 is a diagram illustrating an arrangement example of base stations when a plurality of small cells overlap each other.

FIG. 18 is a diagram illustrating an arrangement example of base stations when the small cells C10 and C20 overlap each other. As illustrated in FIG. 18, the whole or part of the small cells C10 and C20 may overlap each other. Further, all of the cells need not necessarily be small cells, but may be macro cells.

Figure 19:
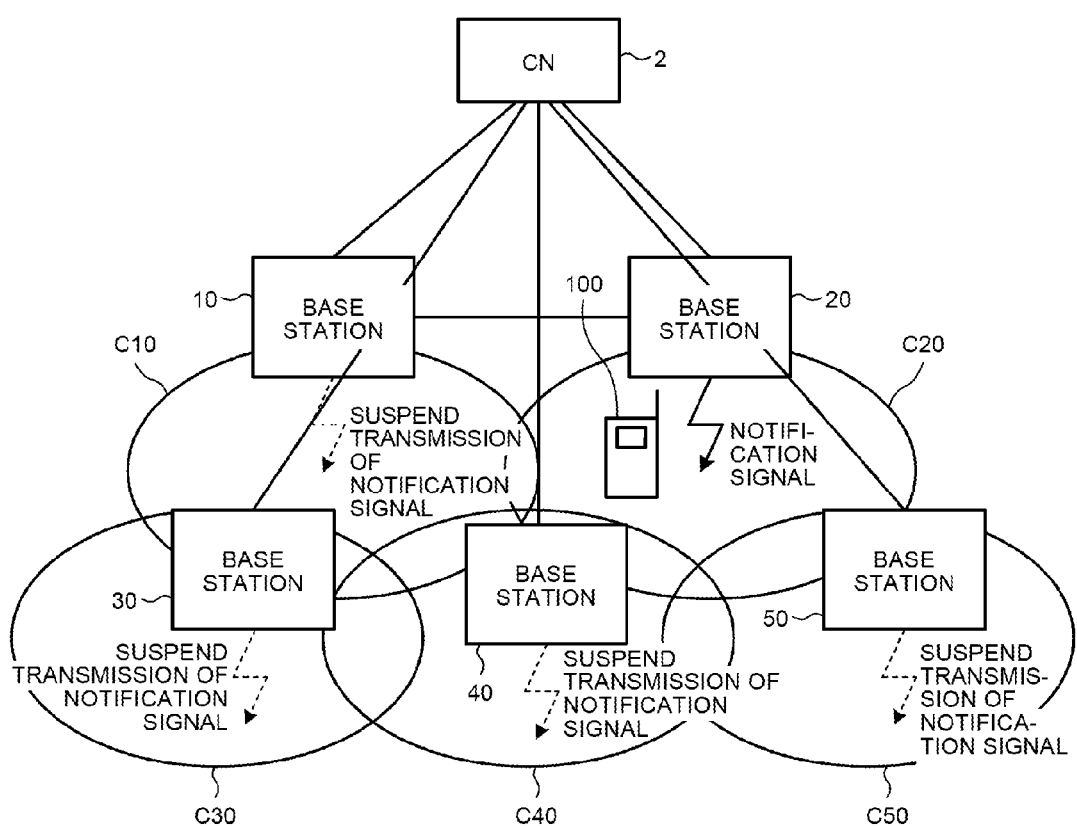
FIG. 19 is a diagram illustrating an arrangement example of base stations when five small cells partly overlap one another.

The number of the base stations connected to the CN 2 need not necessarily be two, but may be three or more. FIG. 19 is a diagram illustrating an arrangement example of base stations when five small cells partly overlap one another. As illustrated in FIG. 19, the base stations 10 and 20 and base stations 30, 40, and 50 that have the same configurations as the base stations 10 and 20 may form five small cells C10 to C50 that partly overlap one another. All of the cells that partly overlap one another need not necessarily be small cells, but may be macro cells, or different types of cells may be mixed.

Figure 20:
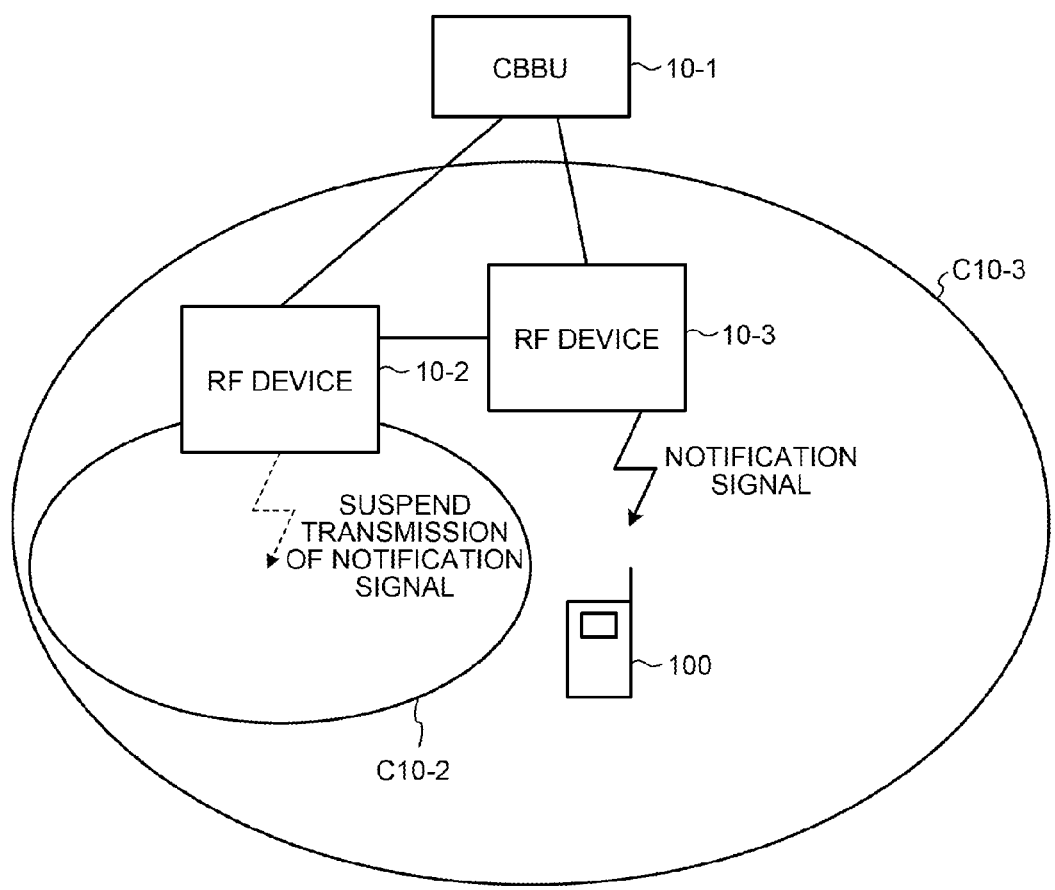
FIG. 20 is a diagram illustrating an arrangement example of RF devices when a small cell and a macro cell are mixed.

Furthermore, devices that form a plurality of cells need not necessarily be base station devices. FIG. 20 is a diagram illustrating an arrangement example of RF devices when a small cell C10-2 and a macro cell C10-3 are mixed. As illustrated in FIG. 20, a plurality of radio frequency (RF) devices 10-2 and 10-3 connected to a control base band unit (CBBU) 10-1 form the small cell C10-2 and the macro cell C10-3, respectively. The whole or part of the small cell C10-2 may or may not be encompassed by the macro cell C10-3 as illustrated in FIG. 20.

Figure 21:
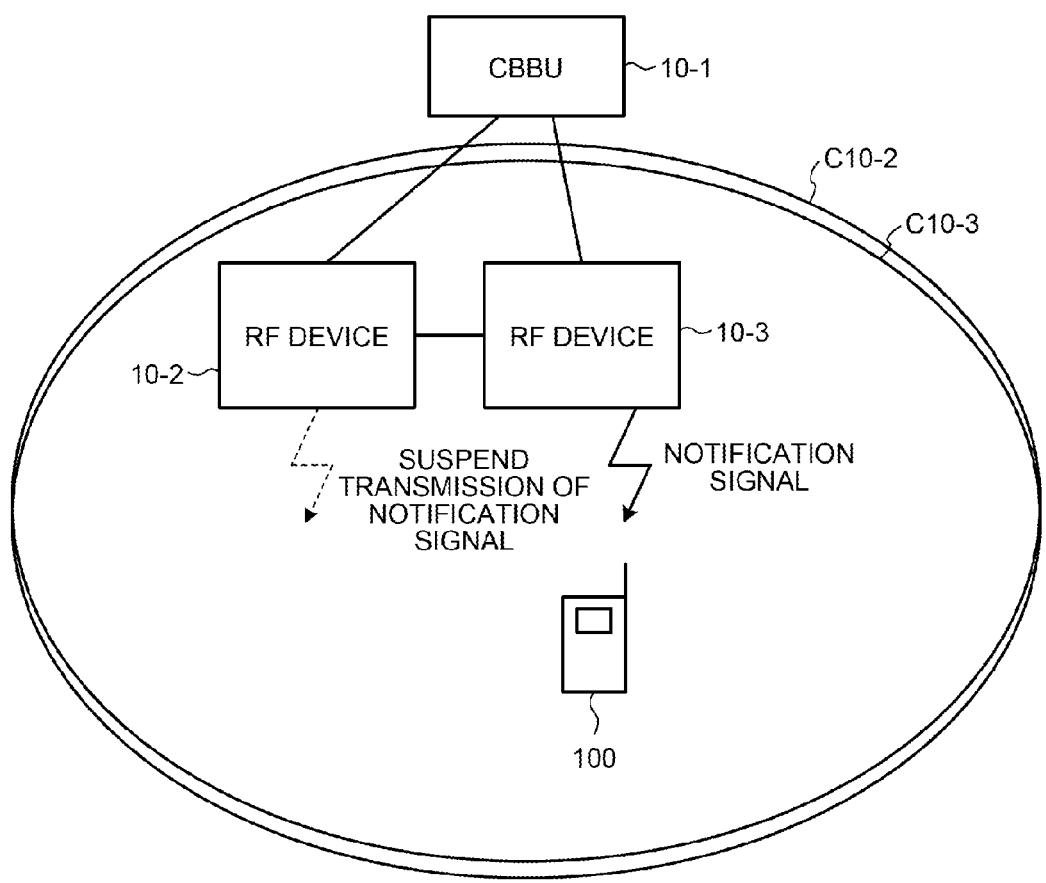
FIG. 21 is a diagram illustrating an arrangement example of RF devices when a plurality of small cells overlap each other.

FIG. 21 is a diagram illustrating an arrangement example of RF devices when the small cells C10 and C20 overlap each other. As illustrated in FIG. 21, the whole or part of a plurality of the small cells C10-2 and C10-3 may overlap each other. Further, all of the cells need not necessarily be small cells, but may be macro cells.

Figure 22:
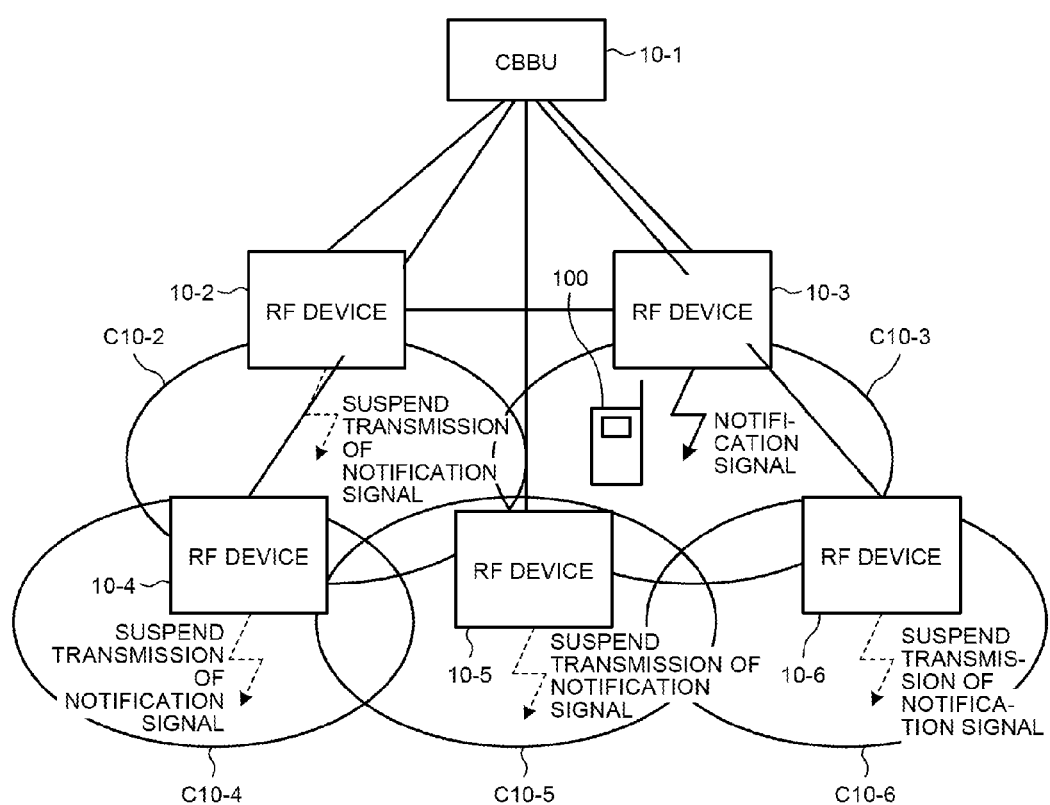
FIG. 22 is a diagram illustrating an arrangement example of RF devices when five small cells partly overlap one another.

The number of the RF devices connected to the CBBU 10-1 need not necessarily be two, but may be three or more. FIG. 22 is a diagram illustrating an arrangement example of RF devices when five small cells partly overlap one another. As illustrated in FIG. 22, the RF devices 10-2 and 10-3 and RF devices 10-4, 10-5, and 10-6 that have the same configurations as the RF devices 10-2 and 10-3 may respectively form five small cells such as the cells C10-2 and C10-3 and cells C10-4, C10-5, and C10-6 that partly overlap one another. All of the cells that partly overlap one another need not necessarily be small cells, but may be macro cells, or different types of cells may be mixed.

In the second to the sixth modifications as described above, only a single base station selected from the base stations 10 and 20 returns to the normal state and executes a transmission sequence with the mobile station 100. However, the number of the base stations that return to the normal states may be plural. For example, if a pilot signal transmitted by the mobile station 100 is an emergency call, there is an urgent need to ensure the communication; therefore, non-selected base stations may return to the normal state by being triggered by reception of the pilot signal and execute the transmission sequence with the mobile station 100. Accordingly, even in an emergency, the mobile station 100 can more reliably establish communication with a base station and transmits communication to a desired party. Consequently, the base station control system 1 can maintain the reliance of the user without increasing power consumption.

While a mobile phone is assumed as the mobile station in the embodiment and each of the modifications as described above, the present invention is not limited to the mobile phone, but may be applied to various communication devices, such as smartphones or personal digital assistants (PDA), that directly or indirectly perform wireless communication with the base station or the RF device. In the second, the third, the fifth, and the sixth modifications, the base station 10 uses a CQI value as an index indicating the reception quality. However, the base station 10 may refer to a received signal strength indication (RSSI) value indicating a radio wave strength or a signal to interference ratio (SIR) value or a signal to interference plus noise ratio (SINR) value indicating a radio wave state, instead of the CQI value.

The components of the base station 10 do not necessarily have to be physically configured in the manner illustrated in the drawings. In other words, specific forms of disintegration and integration of the apparatuses are not limited to those illustrated in the drawings, and all or part of the apparatuses may be functionally or physically disintegrated or integrated in arbitrary units depending on various loads or use conditions. For example, the main control unit 13a and the state change determining unit 13b of the CNT unit 13 may be integrated into a single component, the RRH transmission interface unit 12a and the modulating unit 12a-1 of the BB unit 12 may be integrated into a single component, and the RRH reception interface unit 12b and the demodulating unit 12b-1 may be integrated into a single component. Conversely, the state change determining unit 13b of the base station 10 may be disintegrated into a part that measures a traffic volume and a part that determines whether to stop transmission of a notification signal. Further, the memory 10c may be configured as an external apparatus of the base station 10 so as to be connectable via a cable or a network.

In the above descriptions, individual configurations and operation are explained for each of the embodiment and the modifications. However, the base station 10 according to each of the embodiment and the modifications may be configured to include components specific to the embodiment and the other modifications. Further, not only two of the embodiment and the modifications but also three or more of them may be combined in an arbitrary form. For example, the setting of the priorities in the group according to the third and the fourth modifications may be applied to the determination process based on the reception state in each of the fifth and the sixth modifications. Specifically, the above described priorities in the group may be determined such that the priority increases with a greater reception state of the pilot signal in the base station 10. For another example, the determination process based on the priorities in the group according to the third and the fourth modifications may be applied to the reception sequence illustrated in FIG. 10 and FIG. 11. Further, a single base station may include a plurality of the components described in the embodiment and the first to the sixth modifications as long as the functions of all of the components consist with each other.

According to an aspect of the base station disclosed in the present application, it is possible to reduce power consumption.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
   a receiving unit that receives a connection request signal when the base station is in a power-saving state;
   a determining unit that, when the receiving unit receives the connection request signal, determines whether a priority of the base station is higher than a priority of a different base station that belongs to a same group as the base station;
   a control unit that, when the determining unit determines that the priority of the base station is higher than the priority of the different base station, causes the base station to return from the power-saving state to a normal state; and
   a transmitting unit that wirelessly transmits a notification signal after the base station is returned to the normal state by the control unit.

2. The base station according to claim 1, wherein the determining unit further determines whether there is a second different base station that has received the connection request signal in the group, and when there is the second different base station, determines whether the priority of the base station is higher than the priority the second different base station.

3. The base station according to claim 1, wherein the priority is determined so as to increase with a greater reception state of the connection request signal in the base station.

4. The base station according to claim 1, wherein the connection request signal is a pilot signal that is transmitted from a mobile station in accordance with power-on of the mobile station or outgoing communication from the mobile station.

5. The base station according to claim 1, wherein the connection request signal is a pilot signal that is transmitted from a mobile station in accordance with a handover to the base station by the mobile station.

6. The base station according to claim 1, wherein the connection request signal is a paging signal that is transmitted by the different base station in accordance with incoming communication to a mobile station.

* * * * *